United States Patent
Kaneko et al.

[11] Patent Number: 5,966,353
[45] Date of Patent: Oct. 12, 1999

[54] OPTICAL STORAGE DEVICE MADE THINNER BY SUBSTITUTING ELECTRICAL MEANS FOR CAPABILITIES OF SENSORS

[75] Inventors: Eiji Kaneko; Shigeyoshi Tanaka, both of Kawasaki; Akira Nanba; Kenichi Hamada, both of Kato-gun; Toru Ikeda, Kawasaki, all of Japan

[73] Assignee: Fujitsu Limited, Kawasaki, Japan

[21] Appl. No.: 08/959,454

[22] Filed: Oct. 28, 1997

Related U.S. Application Data

[62] Division of application No. 08/693,700, Aug. 7, 1996.

[30] Foreign Application Priority Data

Aug. 7, 1995 [JP] Japan .................................. 7-201229

[51] Int. Cl.$^6$ ...................................................... G11B 17/22
[52] U.S. Cl. .................................................. 369/32; 369/58
[58] Field of Search .................................. 369/30, 32, 33, 369/44.25, 44.26, 44.27, 44.28, 54, 58, 47, 48, 124; 360/78.04, 78.07, 78.14

[56] References Cited

U.S. PATENT DOCUMENTS

| | | | |
|---|---|---|---|
| 4,744,069 | 5/1988 | Sugiyama et al. | 369/32 |
| 5,077,716 | 12/1991 | Takeda et al. | 360/78.05 X |
| 5,146,440 | 9/1992 | Yamaguchi et al. | 360/78.06 X |
| 5,528,568 | 6/1996 | Nakane et al. | 369/44.28 |
| 5,577,009 | 11/1996 | Takamine | 369/44.28 X |

FOREIGN PATENT DOCUMENTS 7249268  9/1995  Japan .

*Primary Examiner*—Paul W. Huber
*Attorney, Agent, or Firm*—Greer, Burns & Crain, Ltd.

[57] ABSTRACT

There is provided an optical storage device that can position a lens carriage and objective lens even when position sensors for the lens carriage and objective lens are excluded in an effort to make an optical disk unit thinner. In the optical storage device, immediately after an optical disk is loaded in a main body, the cutoff frequency of a filter lying on a path of a reproduction signal is temporarily changed to a lower frequency. A spacing of sectors of the optical disk is detected using a signal sent from the filter. A type of an optical storage medium and a position of a current reproduction track are detected on the basis of the detected sector spacing and data stored in a memory.

3 Claims, 28 Drawing Sheets

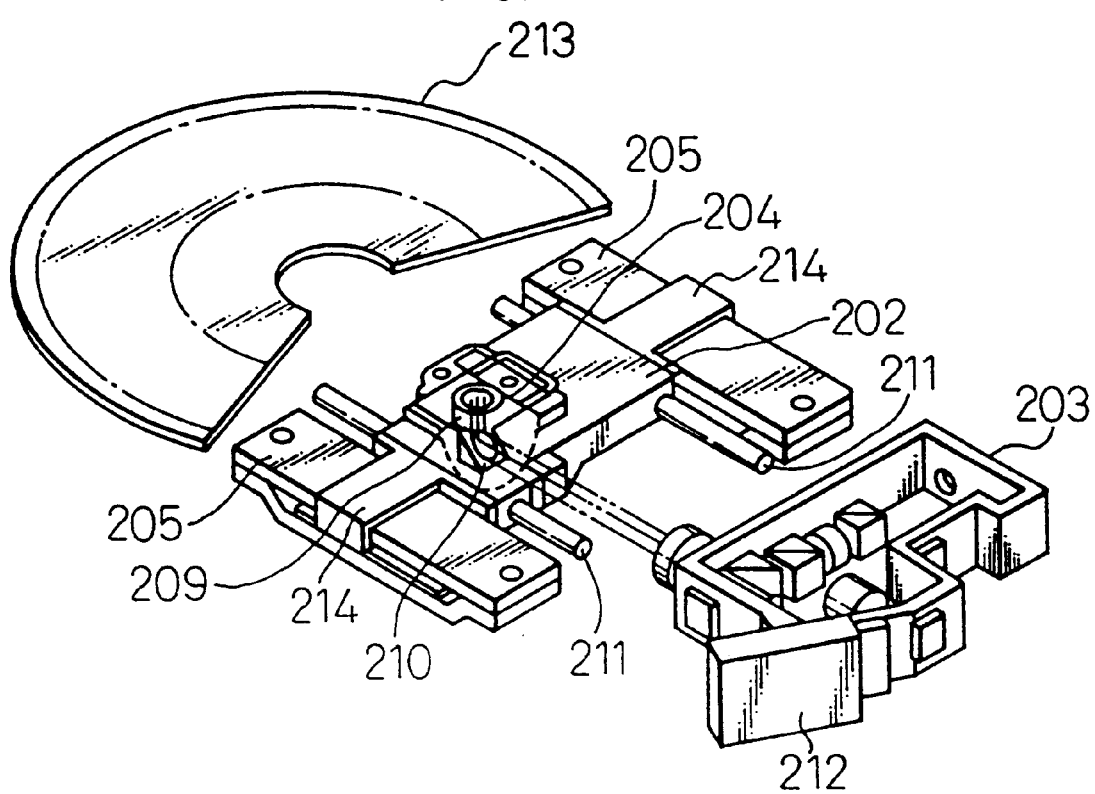

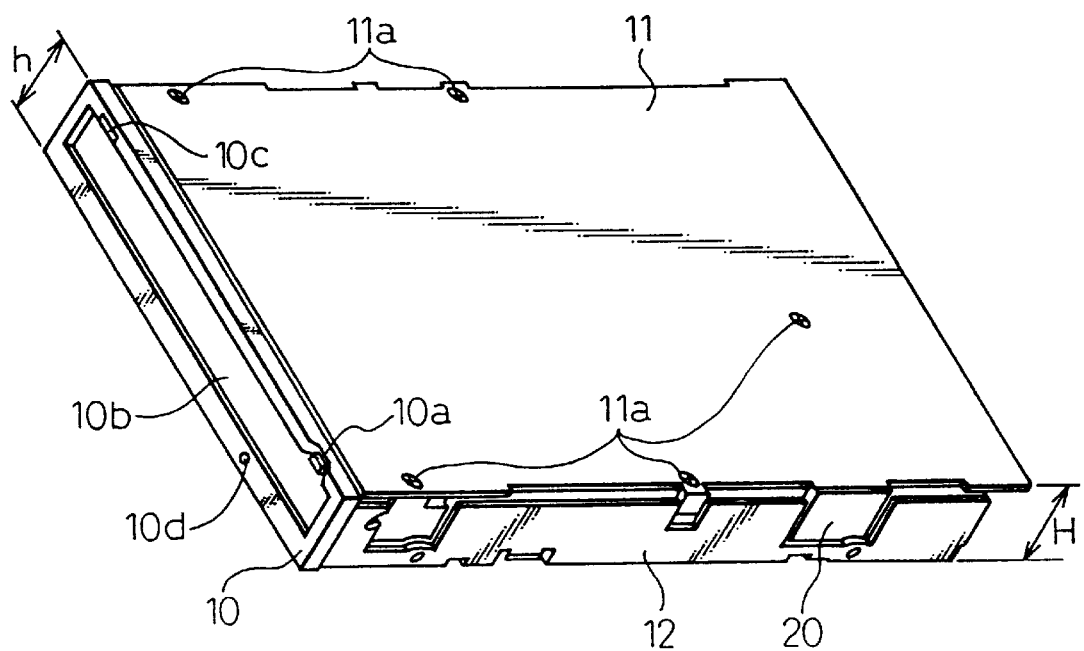

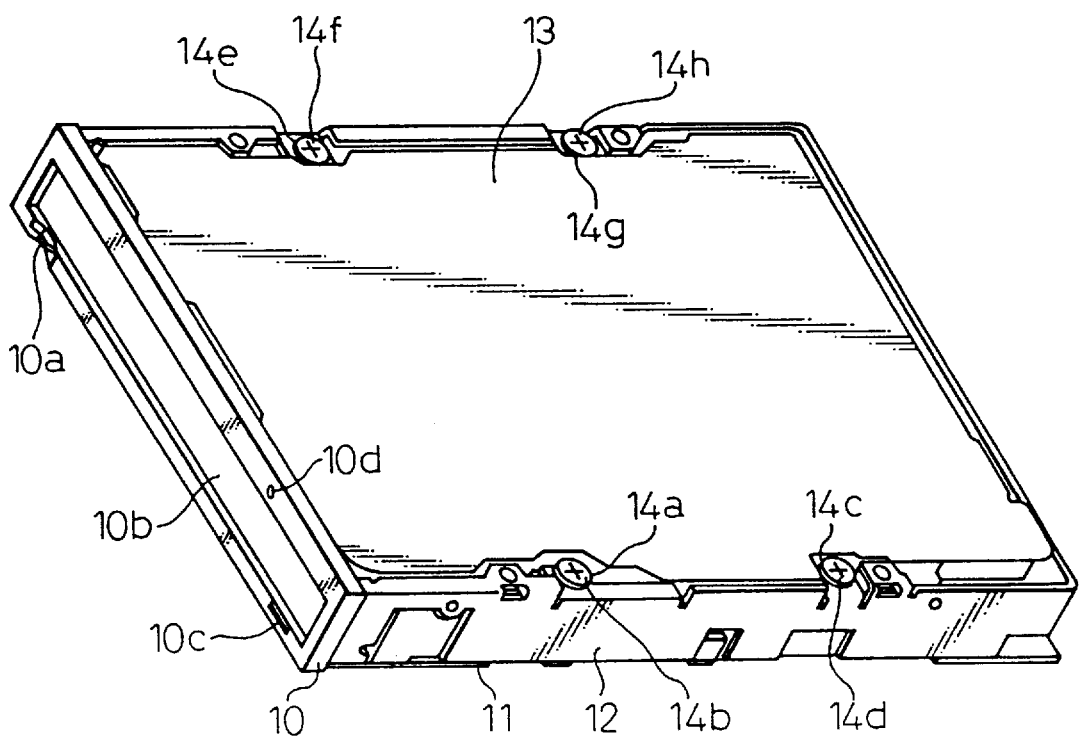

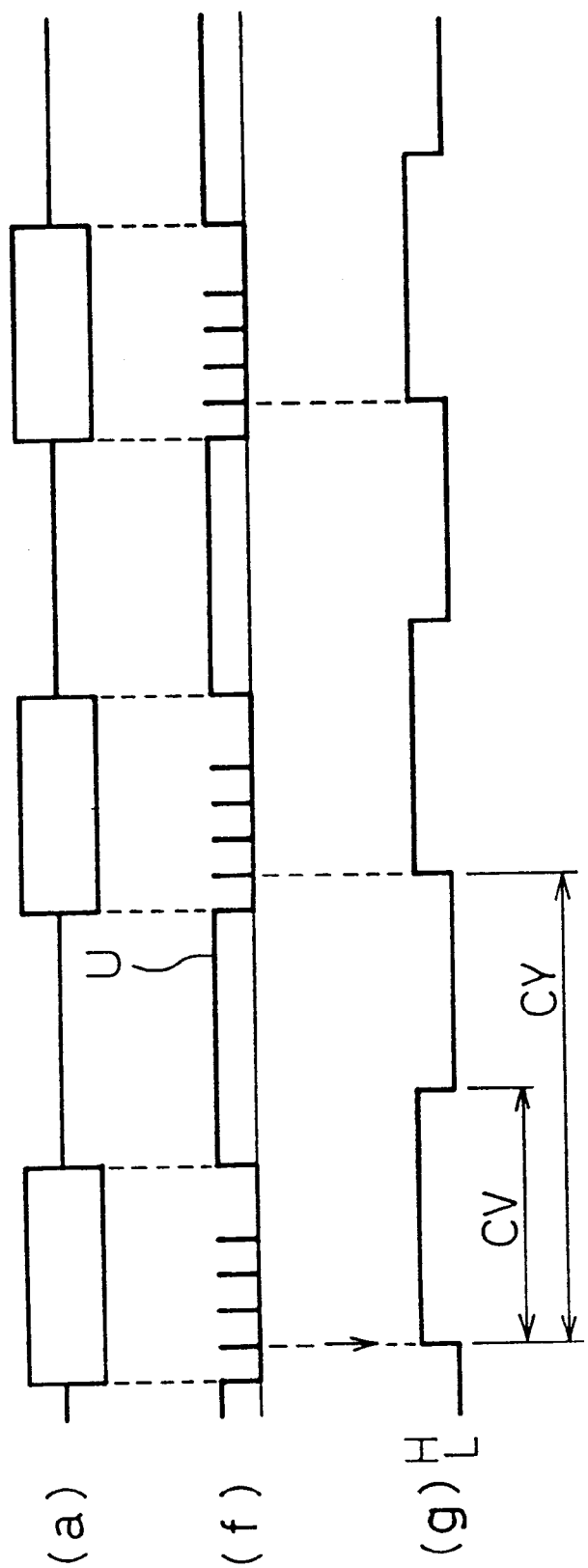

Y (FORWARD OF UNIT)

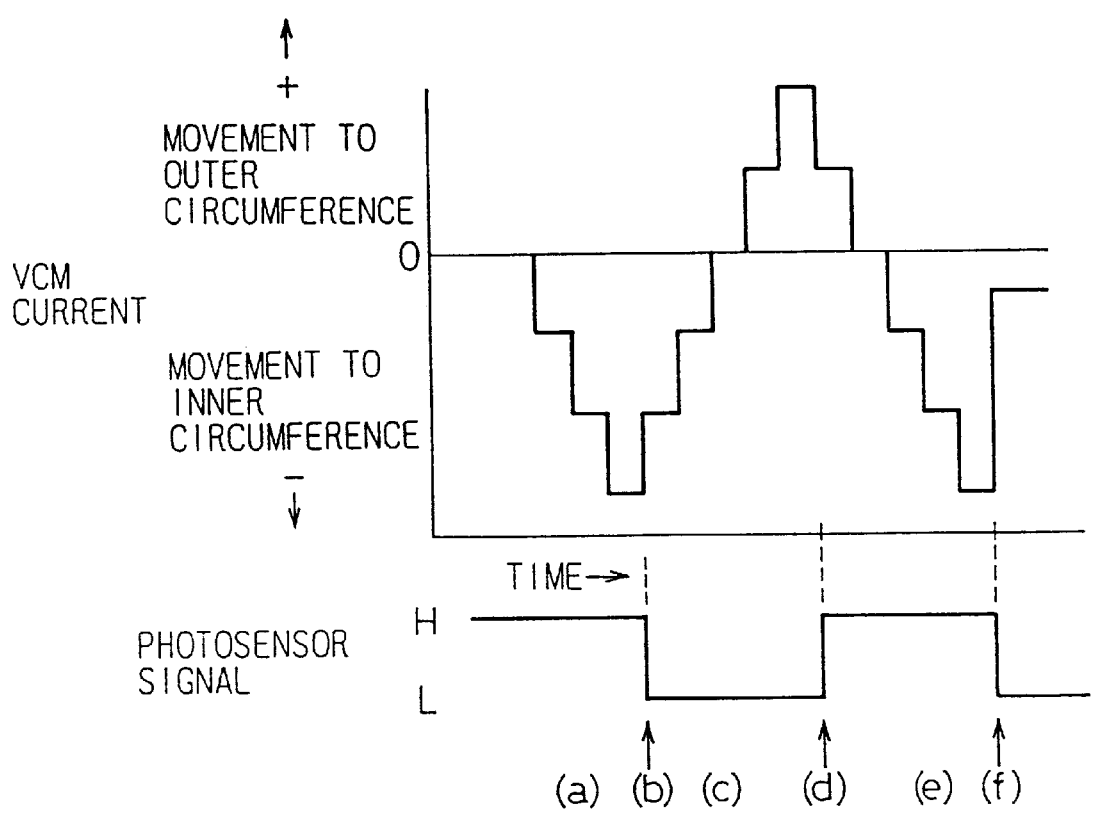

Fig. 23A PRIOR ART
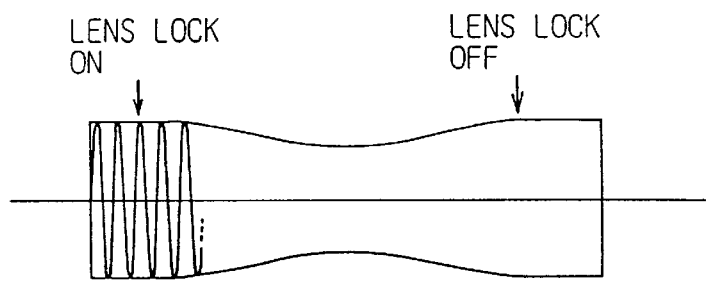
Fig. 23B PRIOR ART
Fig. 23C PRIOR ART
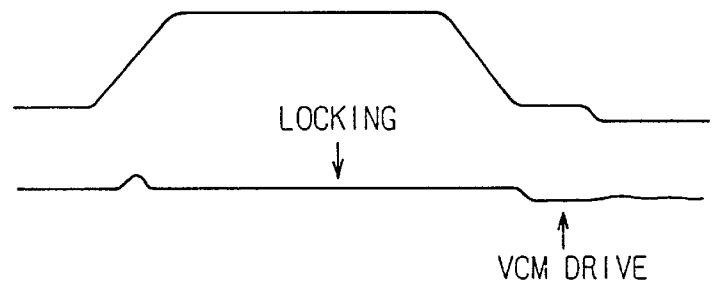
Fig. 23D
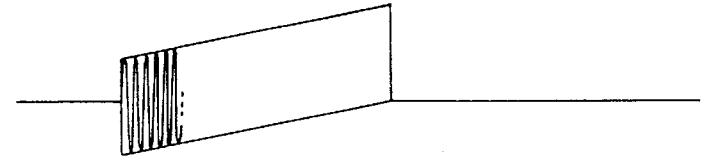
Fig. 23E
Fig. 23F
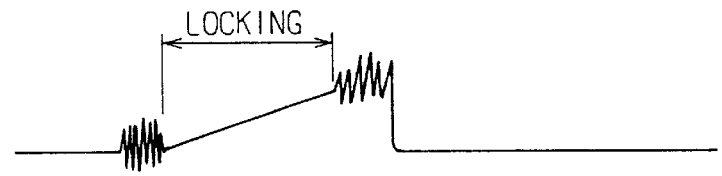
Fig. 23G
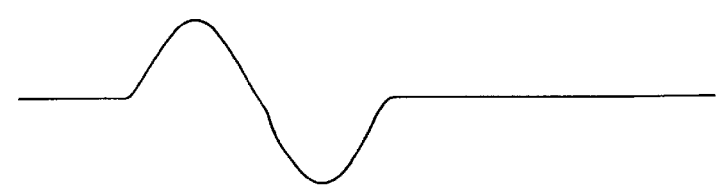

OPTICAL STORAGE DEVICE MADE THINNER BY SUBSTITUTING ELECTRICAL MEANS FOR CAPABILITIES OF SENSORS

This is a divisional of copending application Ser. No. 08/693,700 filed on Aug. 7, 1996, pending.

BACKGROUND OF THE INVENTION

1. Field of the Invention

The present invention relates to an optical storage device, or more particularly, to an optical storage device in which electrical means are substituted for the capabilities of sensors that cannot be stowed in the optical storage device when the optical storage device is made thinner.

2. Description of the Related Art

Speaking of existing storage media, a compact cassette for recording sound which utilizes magnetic tape, a video cassette for recording pictures, and the like, are known. However, data recorded on any of these media is not accessible at random. Besides, the recorded data is analog information. There are therefore such drawbacks that reproduced data may contain noise, that the data may be deteriorated when copied, that the data may be deteriorated when stored for a prolonged period of time, and the like.

As for another kind of storage medium, an optical disk making it possible to record a digital signal, into which data is converted, in a data track on a disk, and to read the signal using returned light of a laser beam irradiated to the data track has been put to practical use. Examples typical of the optical disk are a compact disk (CD) for recording music, a laser disk (LD) for recording pictures, and the like. Moreover, development of a digital video disk (DVD) that is compactly designed for recording pictures is in progress. On the other hand, since these kinds of optical disks have large storage capacities, they have come to be used as data storage media by the names of a CD-ROM, LD-ROM, and the like.

In recent years, a magneto-optical disk making it possible to record data on a recording medium using a laser beam and magnetism, and to read the data using the laser beam has also been put to practical use. Since this kind of magneto-optical disk has a large storage capacity, it is used as an optical storage device in the form of an external memory for a computer.

As mentioned above, storage media using light include an optical disk and a magneto-optical disk. Herein, a description will proceed on the assumption that the storage media using light are regarded generally as optical disks.

The optical disk used for an optical storage device is coming into the spotlight as a storage medium having a pivotal stance in the multimedia systems that have appeared in recent years, and is normally stowed in a cartridge to ensure portability. The optical disk cartridge is loaded in an optical disk unit. Information is then written to or read from the optical disk by means of an optical head.

Currently, the optical disk unit often used externally connected to a computer via an SCSI interface.

Recently, it has become desirable to mount an optical disk unit in a portable personal computer. Technological development is under way at a quick pace in an effort to realize a more compact and lightweight design. Taking, for instance, a floppy disk unit and hard disk unit which have been used as an external storage for a personal computer in the past, the trend toward a more compact design has progressed so greatly that a floppy disk unit or a hard disk unit can be mounted in a slot in a main unit of a personal computer which is approximately 17 mm thick.

For inserting the optical disk unit that is an optical storage device into the slot of approximately 17 mm thick and designed for a floppy disk unit or hard disk unit, the existing optical disk unit must be made thinner.

However, when the optical disk unit is made thinner so that it can be inserted into the slot of approximately 17 mm thick designed for a floppy disk unit or hard disk unit and formed on a personal computer, since a space inside the optical disk unit is restricted vertically, a conventional position sensor and a sensor for detecting the position of an objective lens must be made smaller. Because the size of position sensor and the sensor for detecting the position of an objective lens make it hard to position a carriage having an optical head mounted thereon inside the optical disk unit.

SUMMARY OF THE INVENTION

The first object of the present invention is to provide an optical storage device that, even when made thinner and deprived of a position sensor, can detect the position of a carriage using a signal read from an optical disk medium.

Moreover, the second object of the present invention is to provide an optical storage device that even when made thinner and deprived of a position sensor, can position a carriage in laser output adjustment area of defined on an optical disk medium.

Furthermore, the third object of the present invention is to provide an optical storage device that even when made thinner and deprived of a position sensor, can position an actuator for an objective lens, which is mounted on a carriage, in the center of the carriage.

In an optical storage device according to the first aspect of the present invention for accomplishing the first object of the present invention, immediately after an optical storage medium is loaded in a main unit, a cutoff frequency change means temporarily sets the cutoff frequency of a filter means, which is located on a path of a signal reproduced via a carriage, to a normally-unused lower frequency. A sector spacing detection means detects a spacing of sectors of the optical storage medium using a signal sent from the filter means. The optical storage device further includes a position information memory means for storing positions in a radial direction of an optical storage medium, and frequencies and sector spacings associated with the positions. Based on the detected sector spacing and data stored in the position information memory means, a track position detection means detects the type of the optical storage medium and the position of a current reproduction track.

According to the first aspect, even in such a situation develops that a conventional position sensor and a sensor for detecting the position of an objective lens must be excluded because an optical disk unit is made thinner, the position of the carriage can be detected using a signal read from an optical disk medium. Consequently, the carriage can be positioned.

In an optical storage device according to the second aspect of the present invention for accomplishing the second object of the present invention, an interception means juts out from part of a carriage in a direction parallel to a movement direction of the carriage. Located across a movement trajectory of the interception means is a photosensor means having the incident light thereof intercepted by the interception means only during a period during which the carriage lies in a laser output adjustment area defined in the vicinity of an outer circumference of an optical storage medium. Driving currents used to drive the carriage when light incident to the photosensor means intercepted and not intercepted by the interception means are detected and used to compute a holding current for the carriage. Thus, the carriage is held in the laser output adjustment area.

According to the second aspect, even when the optical disk unit is made thinner and deprived of a conventional position sensor, the position of the carriage can be retained in the laser output adjustment area for a laser diode which is defined on an outer circumference of an optical disk medium.

In an optical storage device according to the third aspect of the present invention for accomplishing the third object of the present invention, when a seek operation of a carriage relative to an optical storage medium is started, the carriage can be accelerated smoothly, decelerated smoothly, and thus positioned on a target track. The vibration of a lens actuator on the carriage occurring during seek is minimized, and the lens actuator is locked substantially in the center of the carriage.

According to the third aspect, even when the optical disk unit is made thinner and deprived of a conventional lens position sensor, an objective lens of the lens actuator mounted on the carriage can be positioned in the center of the carriage during seek by controlling a driving speed at which a voice coil motor (VCM) drives the carriage.

In an optical storage device according to the fourth aspect of the present invention for accomplishing the third object of the present invention, during a seek operation of a carriage relative to an optical storage medium, a false lens signal equivalent to a lens signal used to lock a lens actuator in the center of the carriage is produced on the basis of the envelope of a tracking error signal obtained from reflected light of a light beam emanating from the optical storage medium. The false lens signal is used to lock the lens actuator in the center of the carriage.

According to the fourth aspect, even when an optical disk unit is made thinner and deprived of a conventional lens position sensor, since a lens actuator is supported on a carriage by means of a spring, a tracking error signal (TES) can be produced as a signal containing a component of a lens position sensor output. A false lens lock signal equivalent to a lens lock signal can therefore be produced using the tracking error signal. Consequently, an objective lens of the lens actuator mounted on the carriage can be locked in the center of the carriage during seek.

BRIEF DESCRIPTION OF THE DRAWINGS

The present invention will be more clearly understood from the description as set forth below with reference to the accompanying drawings, wherein:

FIG. 1C is a view for explaining an example of the structure of a conventional optical head;

FIG. 2A is an oblique view of the appearance of the front side of an optical storage device of the present invention;

FIG. 2B is an oblique view of the appearance of the back side of the optical storage device of the present invention;

FIG. 11 is a timing chart depicting the operation described in FIG. 10;

FIG. 18 is a waveform diagram relating to an example of current control for the VCM performed when an output of a position sensor is high and showing a current in the VCM and a waveform of a photosensor signal;

FIG. 23A is a waveform diagram of a conventional tracking error signal generated during seek;

FIG. 23B is a waveform diagram showing the speed characteristic of a conventional VCM;

FIG. 23C is a waveform diagram showing a conventional lens position signal;

FIG. 23D is a waveform diagram showing a tracking error signal generated during seek in accordance with the present invention;

FIG. 23E is a waveform diagram showing a lens position signal needed by a lens actuator;

FIG. 23F is a waveform diagram showing a false lens signal produced from the tracking error signal shown in FIG. 23D; and FIG. 23G shows a waveform of a current flowing into the lens actuator.

DESCRIPTION OF THE PREFERRED EMBODIMENTS

Before describing the preferred embodiments, an explanation will be given of the conventional optical disk unit shown in FIGS. 1A to 1C.

Figure 1A:
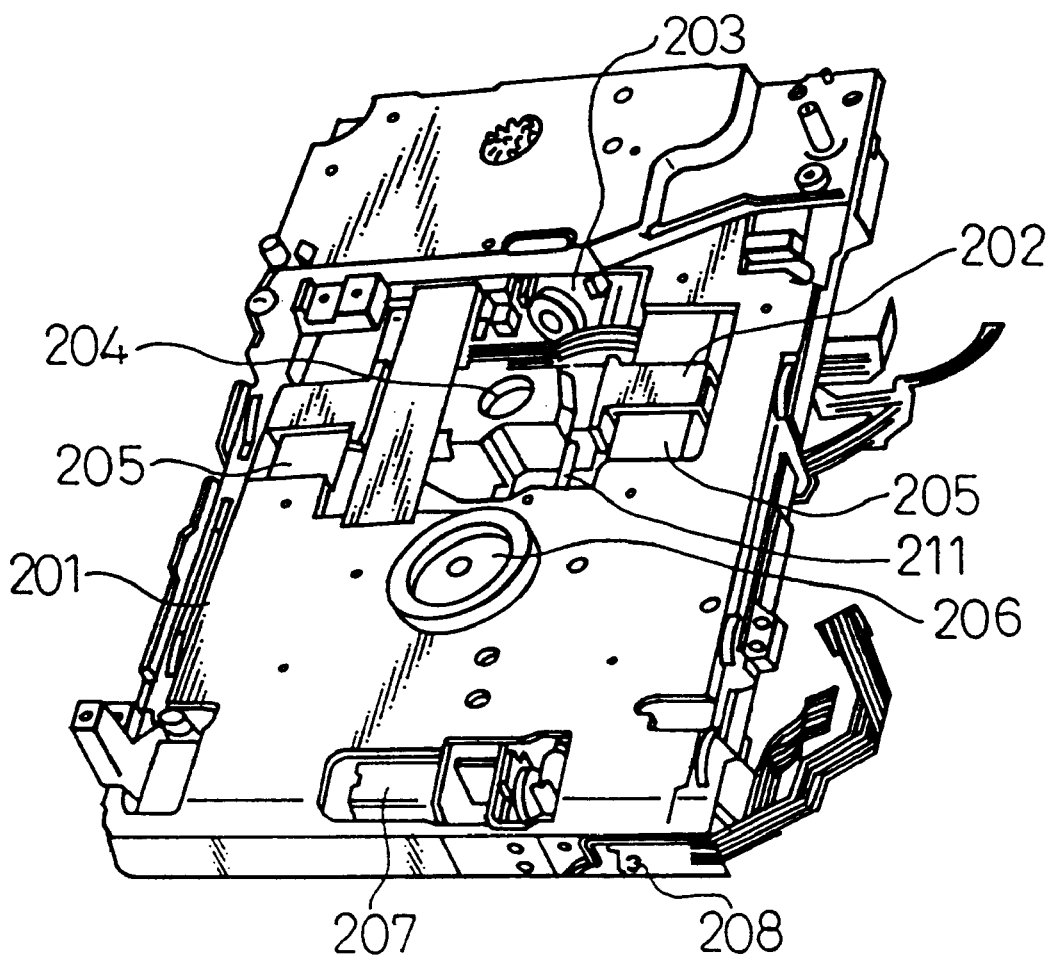
FIG. 1A is an oblique view showing a conventional optical disk unit from above.
Figure 1B:
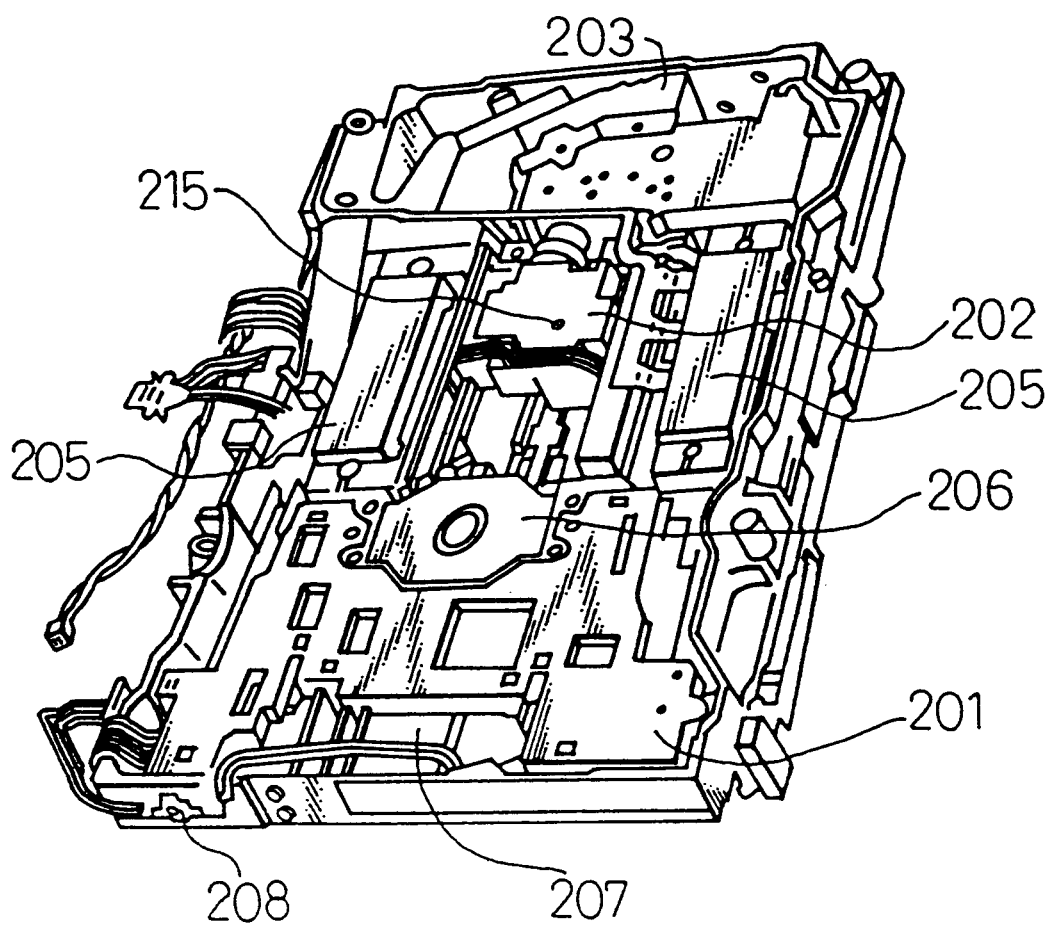
FIG. 1B is an oblique view showing the conventional optical disk unit from below.

FIG. 1A is an oblique view showing an optical disk unit that is a conventional optical storage device from above, wherein the optical disk unit is shown with an upper cover and printed-circuit board thereof removed. FIG. 1B is an oblique view showing the conventional optical disk unit from below with a lower cover thereof removed. Referring to FIGS. 1A and 1B, there are shown a base 201, a carriage 202, a stationary optical unit 203, a lens actuator 204, magnetic circuits 205, a spindle motor 206, an eject motor 207, a switch 208, rails 211, and a light emitting diode (LED) 215. The base 201 has principal components of an optical disk mounted thereon. The carriage 202 has the lens actuator 204 for moving an objective lens constituting a movable optical unit and a mirror (not shown) for modifying an optical path mounted thereon, and moves along the rails 211. The stationary optical unit 203 is composed of a laser diode, a half mirror, a light receiving device, and the like, transmits a light beam to the movable optical unit, and receives reflected light emanating from the movable optical unit so as to reproduce data and servo control information.

The magnetic circuits 205 constitute voice coil motors for moving the carriage 202 along the rails 211. The spindle motor 206 rotates an inserted optical disk medium. The eject motor 207 is incorporated in a mechanism for ejecting the optical disk medium. The switch 208 actuates the eject motor 207.

FIG. 1C is a view for explaining an example of the structure of an optical head for a conventional optical disk unit.

The carriage 202 has, as mentioned previously, the lens actuator 204 for moving the objective lens 209 and a mirror 210 for modifying an optical path mounted thereon, constitutes the movable optical unit, and moves along the rails 211 owing to the effects exerted by currents flowing through coils mounted in holders 214 and magnetic fields formed by the magnetic circuits 205.

The stationary optical unit 203 projects a light beam stemming from the laser diode 212 on the mirror 210 so as to modify the optical path, and thus projects the light beam on the objective lens 209. The objective lens 209 is aligned with a track specified by an upper-level unit of the optical disk medium 213 owing to the operations of the carriage 202 and lens actuator 204. The objective lens 209 is focused on the track with which it is aligned, whereby data writing is enabled. Moreover, light reflected from the optical disk medium 213 along a path reverse to the optical path is received through the objective lens 209 and mirror 210. Data and servo control information are then reproduced.

The objective lens 209 is, as mentioned previously, positioned in the vicinity of a specified track of the optical disk medium 213 by means of the carriage 202 running along the rails 211. The optical disk medium 213 and rails 211 must be strictly parallel to each other to the extent of the parallelism guaranteed by focus servo control. The LED 215 is, as shown in FIG. 1B, attached to the back side of the carriage 202. A position sensor is located in a region opposed to the LED 215, and detects the position of the carriage 202. For positioning the carriage 202 on a specified track of the optical disk medium 213, a signal sent from the position sensor is employed.

However, when an optical disk unit is made thinner so that it can be inserted into a slot approximately 17 mm thick, which is designed for a floppy disk unit or hard disk unit and formed on a personal computer, since the space in the optical disk unit is restricted vertically, a conventional position sensor or a sensor for detecting the position of an objective lens cannot must be excluded. This poses a problem that it becomes hard to position the carriage.

Embodiments of an optical storage device of the present invention will be described below. To begin with, the mechanical structure of a optical storage device which is made thinner and to which the present invention applies will be described.

FIG. 2A is an oblique view of the appearance of the front side of a thinner 3.5-inch optical disk unit of the present invention. FIG. 2B is an oblique view of the appearance of the back side of the optical disk unit shown in FIG. 2A. A front bezel 10 has a door 10b that is constrained to close by means of a spring which is not shown. The door 10b opens on insertion or ejection of an optical disk cartridge.

The front bezel 10 has an eject button 10a and a manual eject hole 10d. The eject button 10a is used to instruct ejection of an optical disk cartridge and execute automatic ejection. The manual eject hole 10d is used to disengage an optical disk cartridge from a unit by inserting a pin or the like thereinto in case of a power dump, inspection, or failure. Moreover, the front bezel 10 has an LED 10c that glows to indicate a state of operation of the unit.

A drive base 20 on which the front bezel 10 is fitted is covered by a printed-circuit board 11 to which various ICs and a flexible printed-circuit board are connected, a frame 12 for defining the outline of the optical disk unit, and a cover 13. The printed-circuit board 11 is secured to the drive base 20. The cover 13 is secured by inserting screws 14a, 14c, 14f, and 14h into holes formed in rubber vibration isolators 14b, 14d, 14e, and 14g as well as holes formed in the drive base 20 and frame 12. A switch coupled to the eject button 10a is mounted on the printed-circuit board 11.

The optical disk unit has a height H of approximately 17 mm with the cover 13 and printed-circuit board 11 fitted on the drive base 20. The height h of the front bezel 10 having the door 10d has a relationship of H≦h relative to the overall height H.

Figure 3:
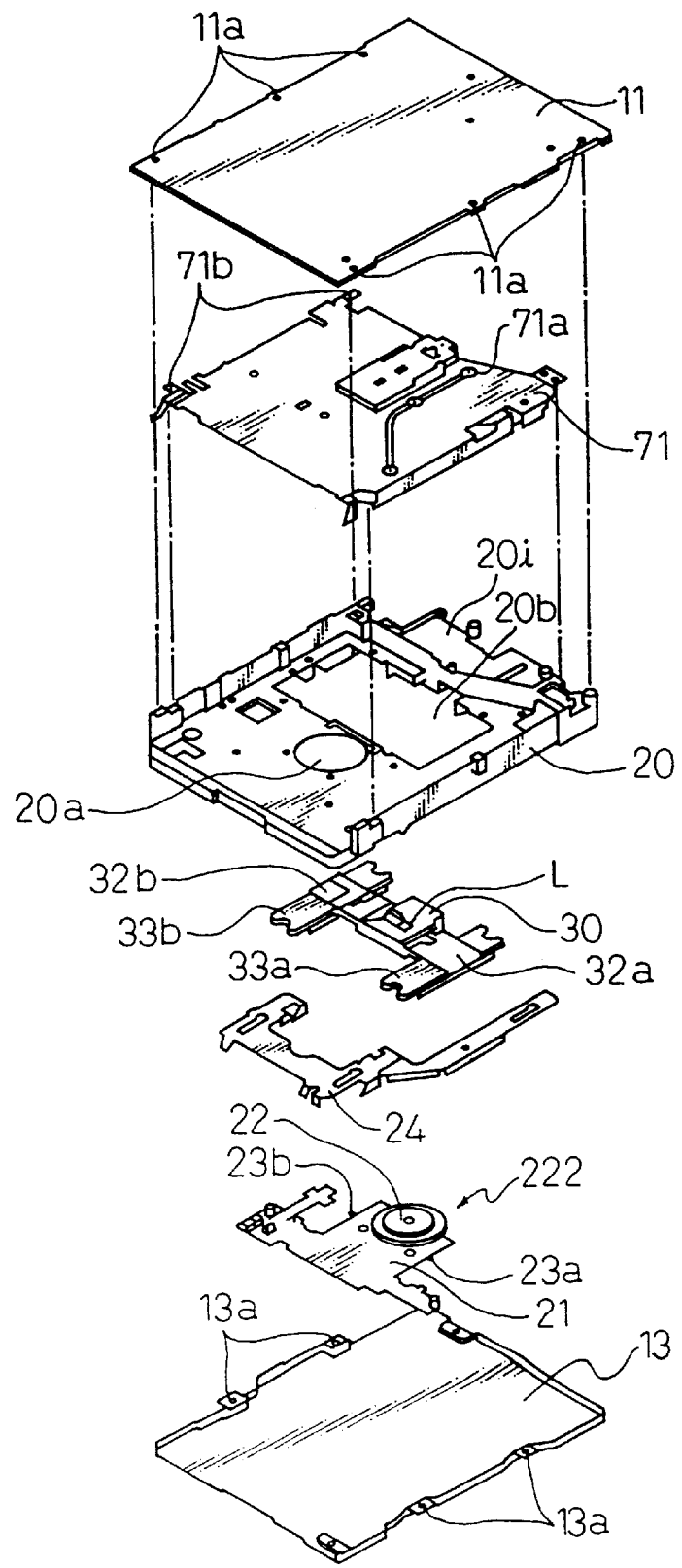
FIG. 3 is an exploded oblique view of the front side of the optical storage device of the present invention.
Figure 4:
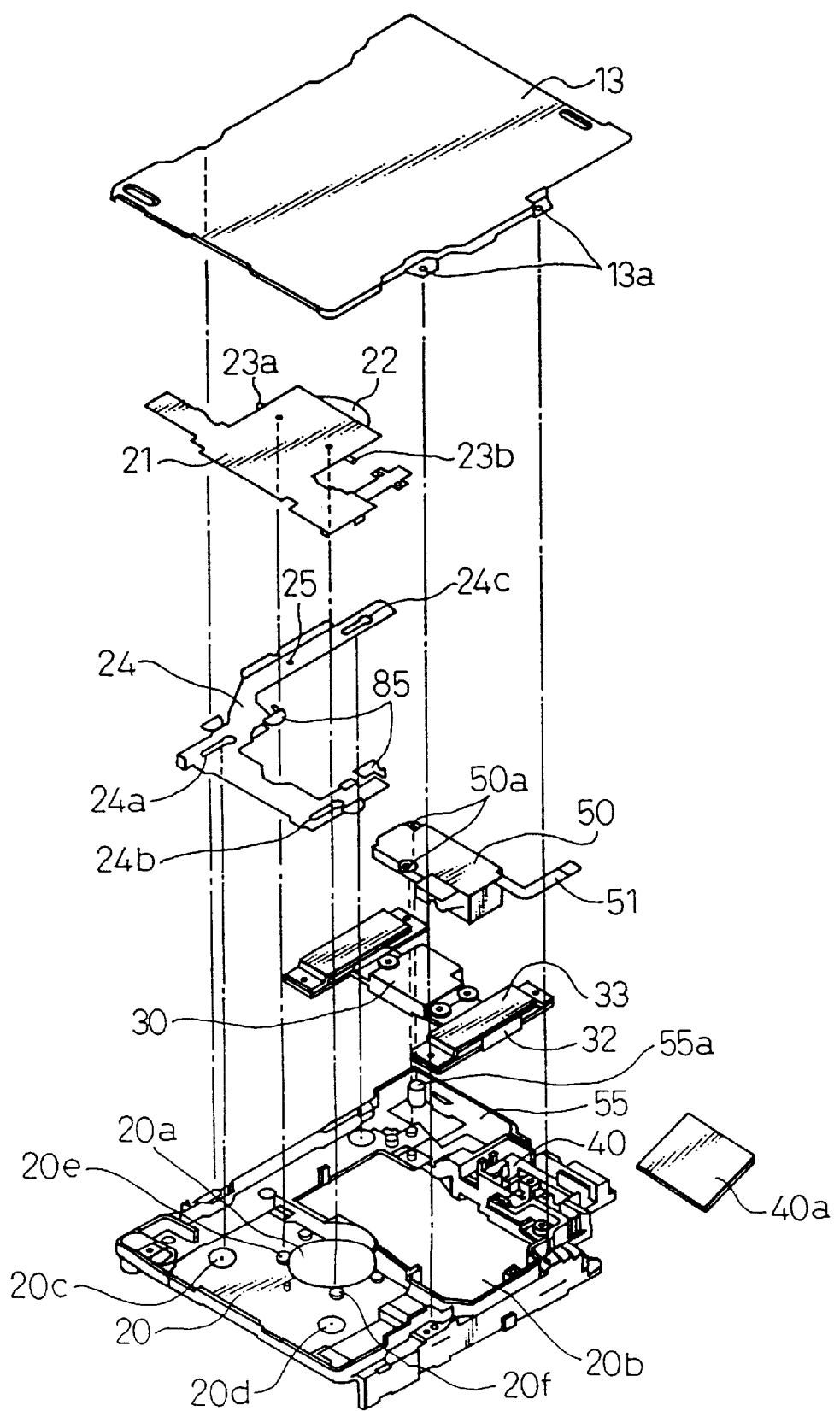
FIG. 4 is an exploded oblique view of the back side of the optical storage device of the present invention.

FIG. 3 is an exploded view of the optical disk unit shown in FIGS. 2A and 2B. FIG. 4 is an exploded view showing the back side of the optical disk unit shown in FIG. 3.

Referring to FIG. 3, the optical disk unit is composed broadly of seven principal parts: a printed-circuit board 11, a cartridge holder 71 having an opening 71a, a drive base 20, a lens carriage 30 having an objective lens L, a slide plate 24, a turntable 22, and a cover 13, which are arranged in that order.

A power connector and interface connector are attached to the printed-circuit board 11. Circuit elements such as a digital signal processor (DSP) for controlling reproduction, recording, and erasure of information relative to an optical disk, an MPU, and the like are mounted on one side of the printed-circuit board 11. The cartridge holder 71 is located below the printed-circuit board 11. The printed-circuit board 11 having parts mounted thereon is joined with the drive base 20 by inserting screws into a plurality of holes 11a through a plurality of mounting sections 71 of the cartridge holder 71. Reference numeral 20i denotes a space.

The drive base 20 has openings 20a to 20f used to mount given parts. A stationary optical unit 40 (not shown in FIG. 3) composed of optical parts for introducing a light beam to a surface of an optical disk or introducing light reflected from an optical disk to a photodetector is formed as a united body on the drive base 20 by die-casting aluminium. A cover 40a is placed as a dust-proof means on the stationary optical unit 40.

The lens carriage 30 for holding a lens and moving it in a radial direction of an optical disk is molded as a united body using a thermally fusible resin or the like with coils embedded in coil sections 32a and 32b at both edges of the lens carriage 30. A magnet is attached to the back side of each of upper yokes of the lens carriage 30. Lower yokes thereof are inserted into center openings of the coil sections 32a and 32b. In this state, the coil sections 32a and 32b are movable relative to the lower yokes. The ends of the upper and lower yokes are joined by screw, whereby magnetic circuits 33a and 33b are realized.

A turntable unit 222 is mounted on a plate 21. Slide pins 23a and 23b are attached to the right- and left-hand sides of the plate 21. The turntable 22 of 21 mm in diameter juts out toward the cartridge holder 71 through the opening 20a of the drive base 20. When an optical disk cartridge is inserted into the cartridge holder 71, the hub of the optical disk is attracted by a magnetic body attached to the front side of the turntable 22, and thus retained. The turntable 22 is connected to a spindle motor for rotating the turntable at a given rotation speed.

An eject motor 50 used to eject an optical disk cartridge is stowed in an eject motor stowage section 55 of the drive base 20. The eject motor 50 is joined with the drive base 20 by tightening screws, which are not shown, inserted through screw holes 50a and screw holes 55a.

The slide plate 24 that slides in a back-and-forth direction of the unit by means of the eject motor 50 when an optical disk cartridge is to be ejected is located above the plate 21 having the turntable 22. When the plate 21 is raised by sliding the slide pins 23a and 23b of the plate 21 along guides 85 of the slide plate 24, the turntable 22 rises through the opening 20a. The turntable 22 is then disengaged from the hub of the optical disk, whereby the optical disk cartridge is unloaded.

After the foregoing parts are mounted on the drive base 20, the frame 12 is fitted on the drive base 20 so that the frame 12 can cover the outer circumference of the drive base 20. The cover, molded by pressing a ferromagnetic material such as stainless steel, is then screwed to the opposite side of the drive base 20 relative to the cartridge holder 71.

Figure 5:
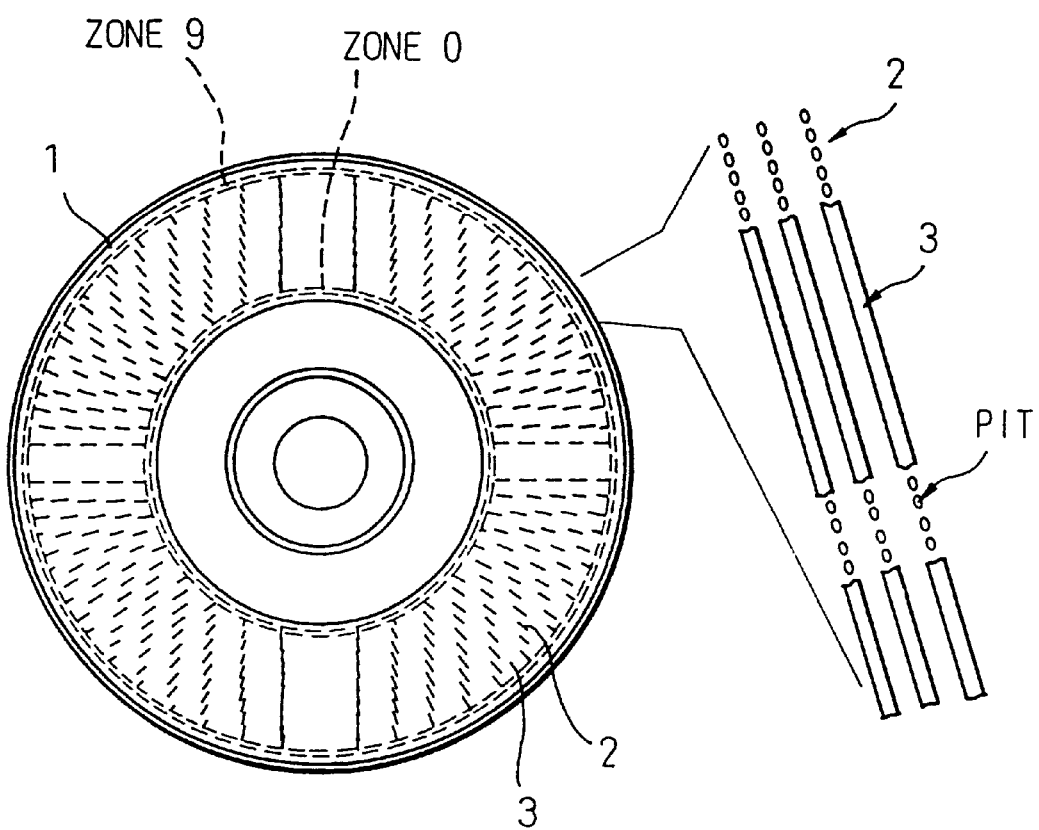
FIG. 5 is an explanatory diagram showing the structure of an optical disk.

FIG. 5 shows the structure of an optical disk medium 1 to be inserted into a main body of the optical disk unit through the door 10b of the front bezel 10 described in conjunction with FIG. 2. The optical disk medium 1 is concentrically divided into a plurality of zones from the inner circumference thereof to the outer circumference thereof. In this embodiment, the innermost circumferential part is zone 0 and the outermost circumferential part is zone 9. Each zone includes a plurality of tracks. Each track has an ID division 2 that merely reflects a light beam emanating from the aforesaid laser diode (also referred to as an embossed division or pre-formatted division), and a MO recording division 3 used to record or reproduce data by means of a light beam (also referred to as a data division). The ID division 2 is depicted with a short black line in FIG. 5. When enlarged, the ID division 2 looks like a set of numerous embossed grooves which are called pits. A sector mark, track signal, section signal, CRC signal, and the like are written in the ID division. A zone number, track number, and the like indicating a zone, track, and the like from which data is currently reproduced can be detected by reproducing a signal read from the ID division 2. The MO recording division 3 is an area interposed between ID divisions 2 and used to record data.

Sections of the optical disk medium 1 having the foregoing structure have substantially the same length. As long as the rotation speed of the optical disk medium 1 is constant, the cycle of an ID division in a zone on the outermost circumference is the fastest.

Figure 6:
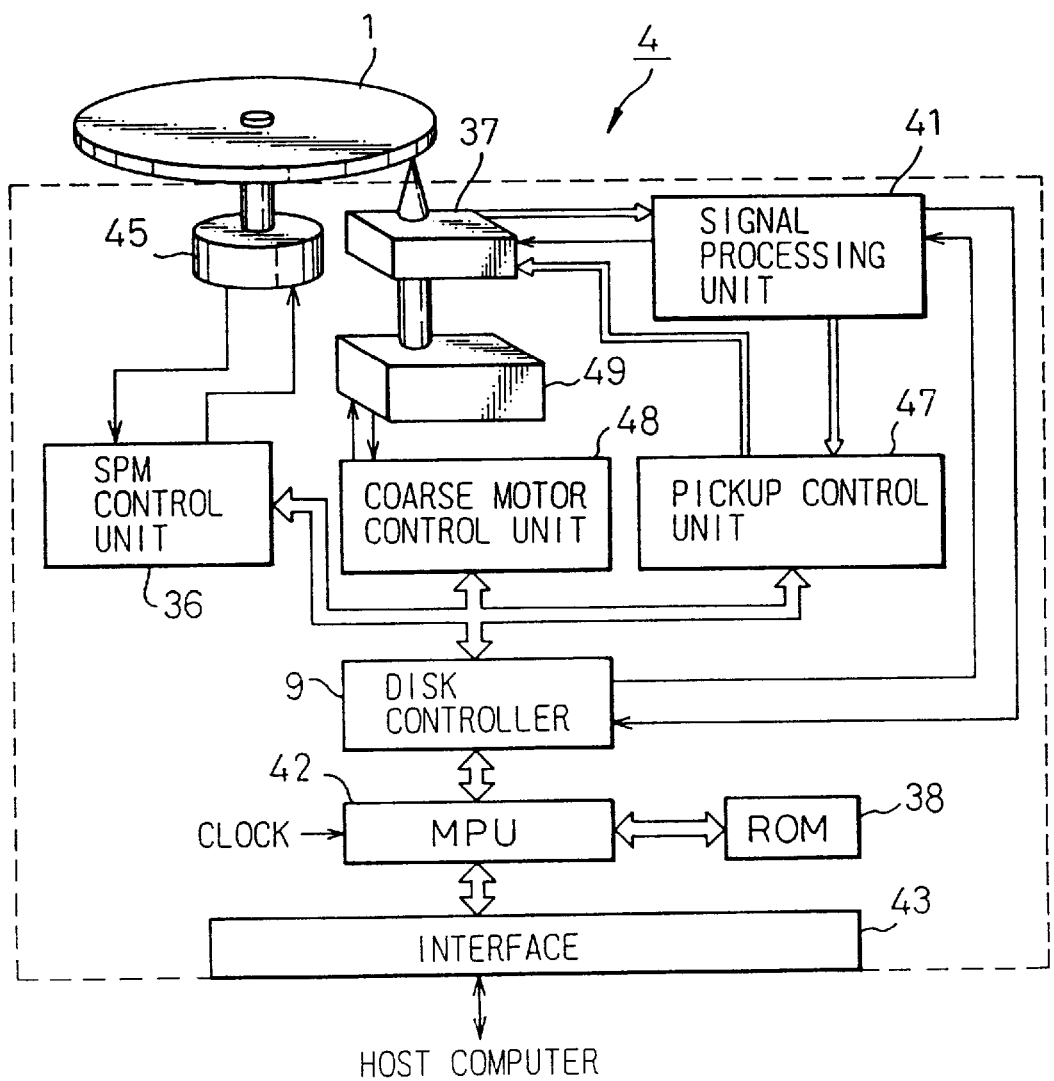
FIG. 6 is a basic configuration diagram of an optical disk unit.

FIG. 6 is a block configuration diagram showing the basic configuration of the optical disk unit 4 having the aforesaid components. In the optical disk unit 4, a microprocessor unit (MPU) 42 transmits or receives commands or data to or from a host computer via an interface 43. A read-only memory (ROM) 38 in which data on the optical disk medium 1 is stored is connected to the MPU 42. The rotation of a spindle motor (SPM) 45 for rotating the optical disk medium 1 is controlled by an SPM control unit 36. Moreover, an optical pickup 37 for reproducing data can be moved in a radial direction of the optical disk medium 1 by means of a motor 49 controlled by a coarse motor control unit 48. The optical pickup 37 irradiates laser light to a data side of the optical disk medium 1 and receives reflected light.

The optical pickup 37 includes a laser diode for irradiating laser light and a motor used to track a track of the optical disk medium 1. Focus of the laser diode or tracking is controlled by a pickup control unit 47. Data reproduced by the optical pickup 37 is processed by a signal processing unit 41.

The pickup control unit 47, SPM control unit 36, and coarse motor control unit 48 are controlled by a disk controller 9. Signals are transmitted or received between the disk controller 9 and signal processing unit 41. The disk controller 39 transmits or receives a command or data to or from the MPU 42 synchronously with a clock.

Thus, the optical disk unit 4 rotates the optical disk medium 1 at a certain speed using the SPM 45, moves the optical pickup 37 in the radial direction of the optical disk medium 1, performs focus or tracking, and thus reproduces data. In reality, as described previously, the optical pickup 37 is composed of a stationary optical unit for generating a light beam using a laser diode, and a carriage for projecting the light beam on a mirror so as to modify the optical path, and thus projecting the light beam on the optical disk medium 1 via an objective lens. The objective lens on the carriage is aligned with a track specified by an upper-level unit of the optical disk unit 1 due to the operation of the lens actuator, and focused on the track. Thus, the optical pickup 37 writes data on the optical disk medium 1. The optical pickup 37 receives light reflected from the optical disk medium 1 via the objective lens and mirror along a path reverse to the above optical path. The signal processing unit 41 then reproduces data and servo control information. The motor 49 is realized with voice coil motors for moving the carriage along rails.

The optical disk unit 4 to which the present invention applies is made as thin as approximately 17 mm in thickness. A position sensor and a sensor for detecting the position of an objective lens are not included. The carriage cannot therefore be positioned unless a suitable measure is taken. When the power supply is turned on, if it is uncertain on which track of the optical disk medium 1 the optical pickup 37 (carriage) is located, the optical disk unit 4 will not be able to perform writing or reading on the optical disk medium 1 thereafter.

In an optical storage device according to the first aspect of the present invention, even when it is made thinner and deprived of a position sensor and a sensor for detecting the position of an objective lens, the position of a carriage can be detected using a signal read from the optical disk medium 1. The components concerned will be described below.

Figure 7:
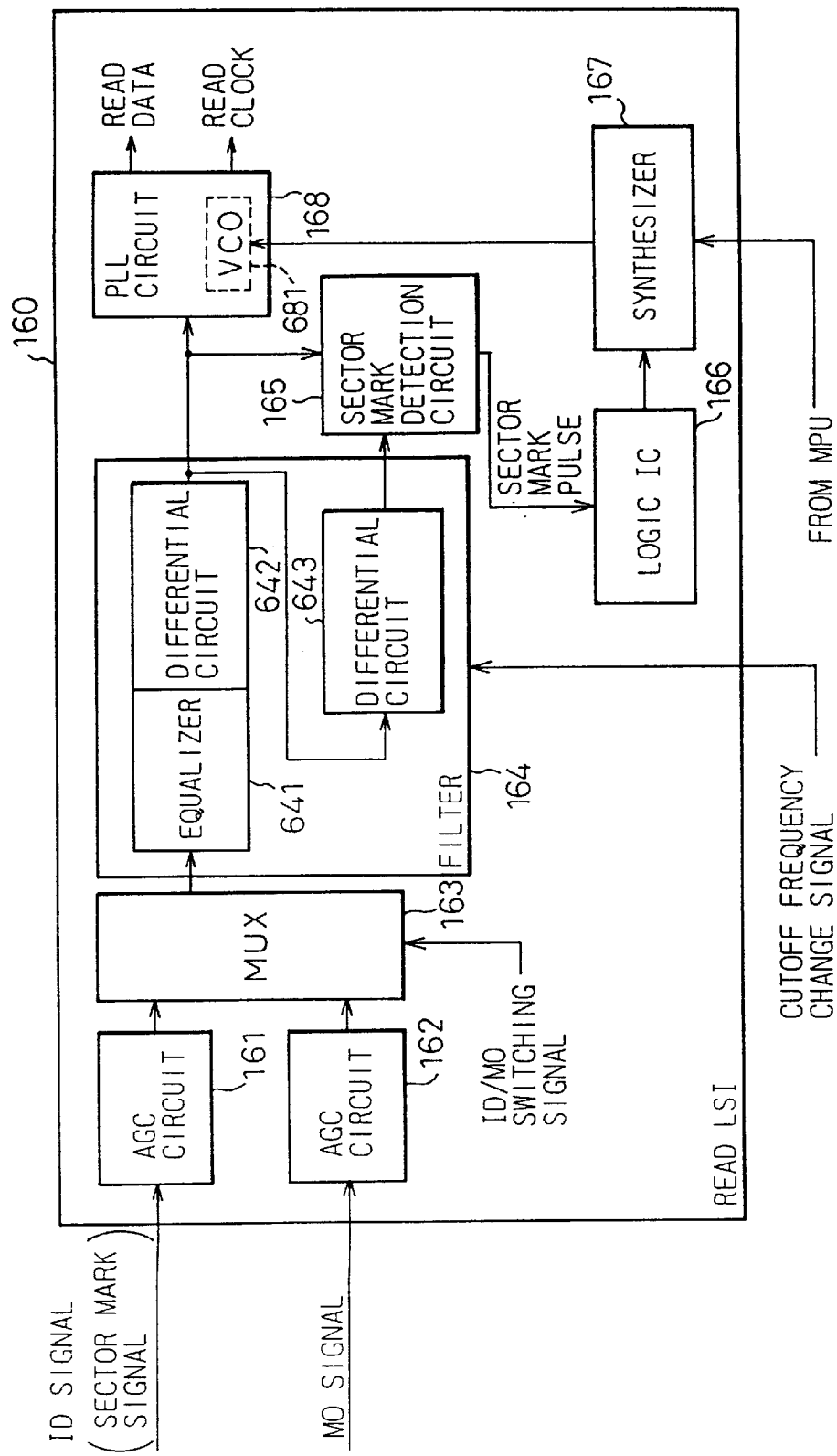
FIG. 7 is a block circuit diagram showing the configuration of a read LSI in a signal processing unit shown in FIG. 6 in the first embodiment of the present invention.

FIG. 7 shows the configuration of a read LSI 160 incorporated in the signal processing unit 41 shown in FIG. 6. The read LSI 160 includes two automatic gain control (AGC) circuits 161 and 162, a multiplexer (MUX) 163, a filter 164, a sector mark detection circuit 165, a logic IC 166, a synthesizer 167, and a phase-locked loop (PLL) 168.

The AGC circuit 161 controls the gain of an ID signal including a sector mark signal and inputs it to the MUX 163. The AGC circuit 162 controls the gain of an MO signal and inputs it to the MUX 163. The MUX 163 processes a signal sent from an internal ID signal processor or MO signal processor according to an ID/MO switching signal sent from the MPU, and sends a resultant signal to the filter 164. The filter 164 includes an equalizer 641 and two differential circuits 642 and 643. A signal input to the filter 164 is differentiated primarily by the differential circuit 642 after passing through the equalizer 641. A resultant primary differential signal is branched out into three portions that are input to the differential circuit 643, sector mark detection circuit 165, and PLL 168. The primary differential signal input to the differential circuit 643 is further differentiated to be a secondary differential signal, and then input to the sector mark detection circuit 165. The sector mark detection circuit 165 detects sector mark pulses in the input primary differential signal and secondary differential signal. The sector mark pulses are sent to the logic IC 166. An output of the logic IC 166 is input to the synthesizer 167. A signal sent from the MPU is also input to the synthesizer 167. A synthetic signal provided by the synthesizer 167 is then input to a voltage-controlled oscillator (VCO) in the PLL 168. The PLL uses the primary differential signal and the signal sent from the synthesizer 167 to generate read data and a read clock.

Figure 8:
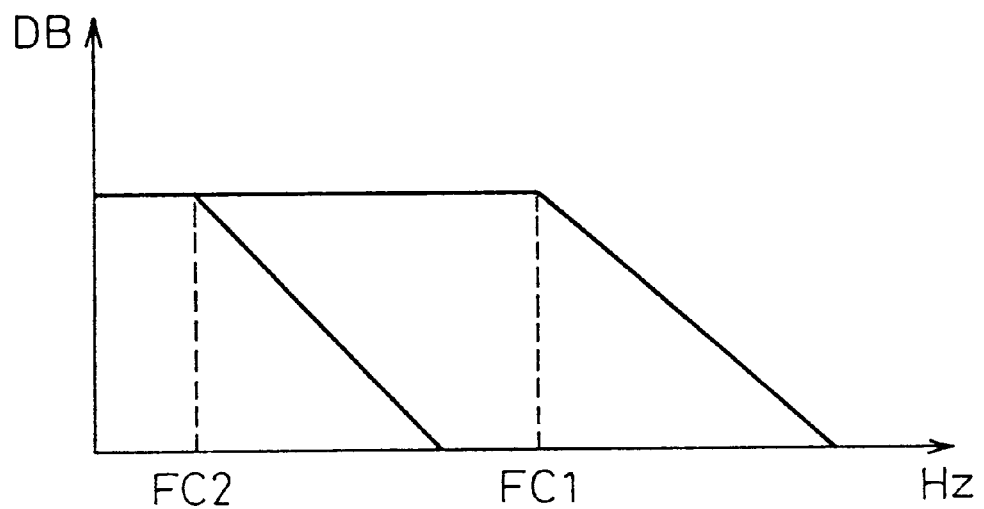
FIG. 8 is a characteristic graph for explaining the change of the cutoff frequency of a filter shown in FIG. 7 in accordance with the present invention.

A cutoff frequency change signal is input from an external MPU to the filter 164 in the read LSI 160 having the foregoing components. The filter 164 is a low-pass filter in which, as shown in FIG. 8, a normal cutoff frequency FC1 and a cutoff frequency FC2 used to identify a zone are set. For example, the cutoff frequency FC1 is 15.4 MHz, while the cutoff frequency FC2 is such a low frequency that it is not used normally for reproducing an MO signal, and is, for example, 2 MHz.

Figure 9A:
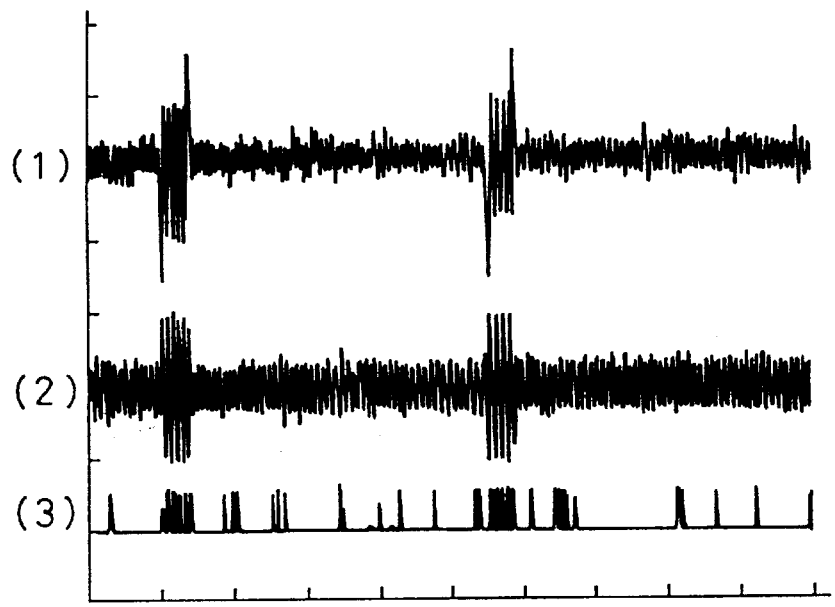
FIG. 9A shows waves of signals obtained with the cutoff frequency set high, wherein (1) shows a wave of an ID signal, (2) shows a wave of a primary differential signal, and (3) shows a wave of a sector mark signal.
Figure 9B:
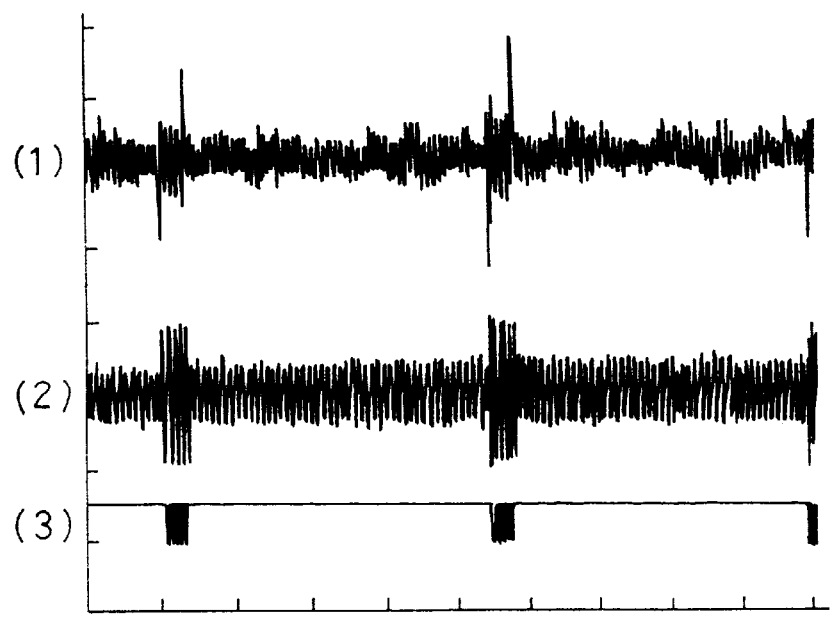
FIG. 9B shows waves of signals obtained with the cutoff frequency set low, wherein (1) shows a wave of an ID signal, (2) shows a wave of a primary differential signal, and (3) shows a wave of a sector mark signal.

FIG. 9A shows signals obtained when the cutoff frequency set in the filter 164 shown in FIG. 7 is the high frequency FC1, wherein (1) shows an ID signal, (2) shows a primary differential signal, and (3) shows a sector mark signal (sector mark pulse). FIG. 9B shows signals obtained when the cutoff frequency of the filter 164 is the low frequency FC2, wherein (1) shows an ID signal, (2) shows a primary differential signal, and (3) shows a sector mark signal (sector mark pulse). In the ID signals shown in (1) in FIGS. 9A and 9B, a component having a large amplitude is a sector mark signal read from the ID division 2 in FIG. 5. A component having a small amplitude is a signal read from the MO recording division 3 shown in FIG. 5. As seen from the comparison between FIGS. 9A and 9B, when the cutoff frequency is high (FC1), the sector mark signal contains noises as well as sector mark pulses. Many noises are seen contained even in the signal read from the MO recording division 3. By contrast, when the cutoff frequency is low (FC2), any signal other than sector mark pulses is not seen contained in the sector mark signal. Consequently, once the cutoff frequency is lowered, a position on the optical disk medium 1 can be predicted by measuring the cycle of the sector mark signal.

In the optical storage device according to the first aspect of the present invention, as mentioned above, the cutoff frequency of the filter 164 is lowered immediately after the power supply is turned on. This makes it easier to detect sector mark pulses of a sector mark signal. The cycle of the detected sector pulses is detected, whereby the storage capacity of the optical disk medium 1 from which data is currently reproduced by a carriage and a track number concerned are detected.

A procedure of the above detection will be described in conjunction with the flowcharts of FIGS. 10A and 10B.

Figure 10A:
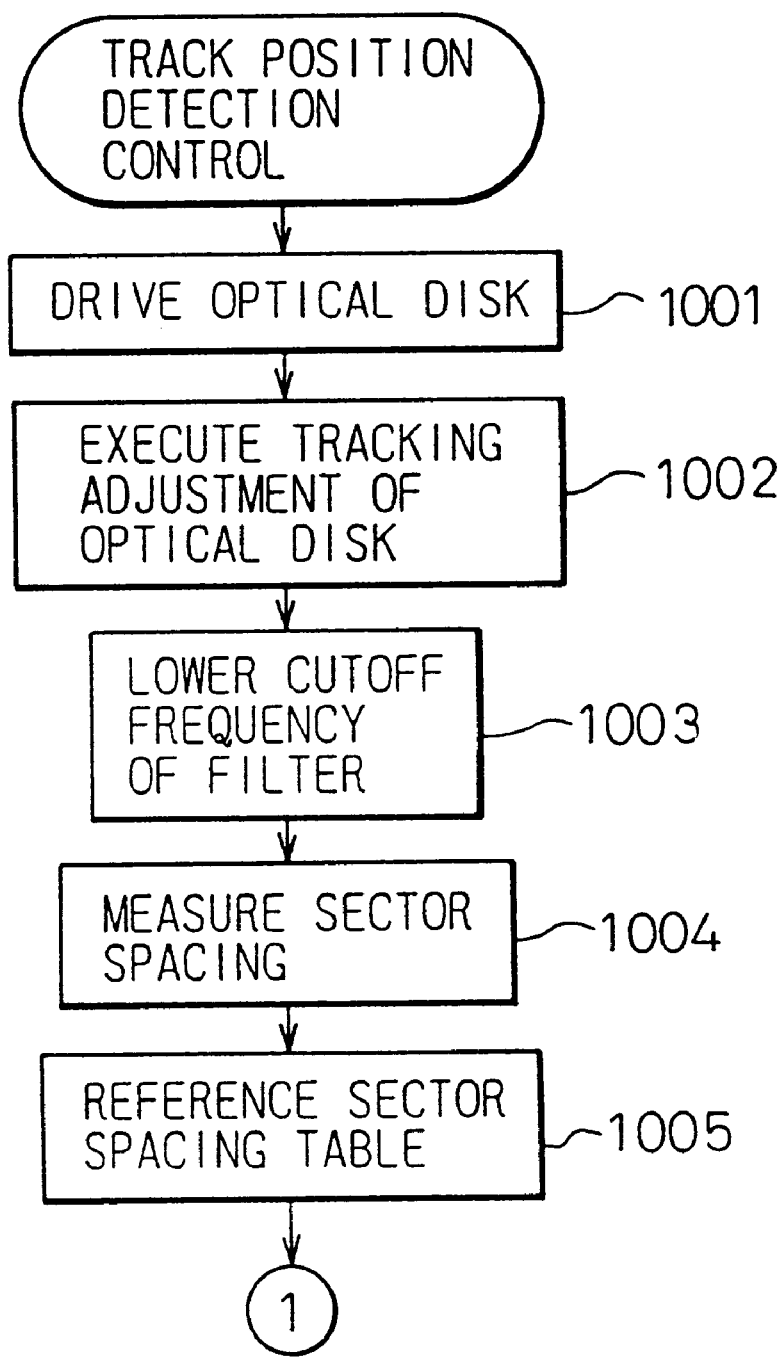
FIGS. 10A and 10B are flowcharts describing a detection control procedure concerning the position of a track in the first embodiment of the present invention.
Figure 10B:
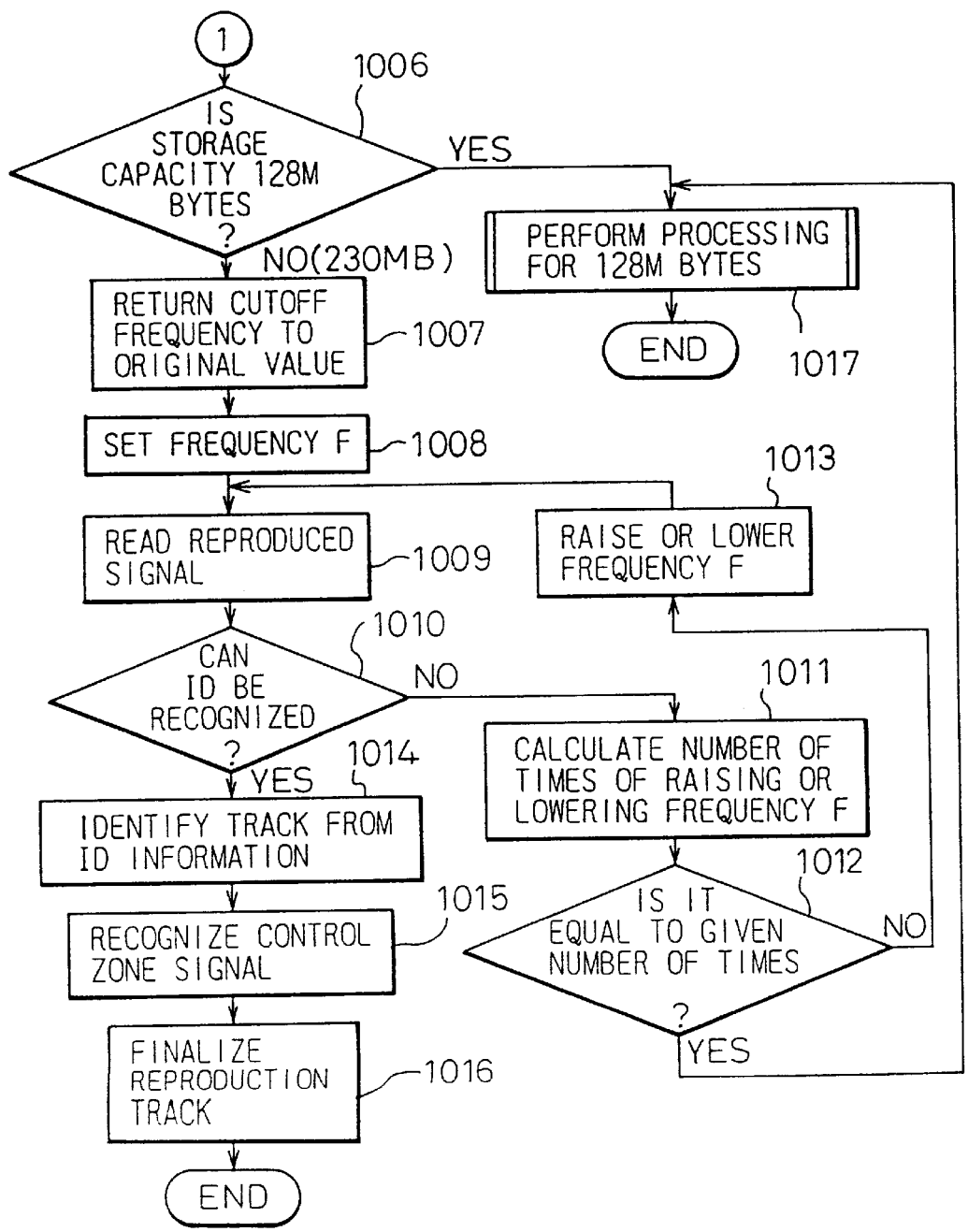

A routine described in FIGS. 10A and 10B is activated when the optical disk medium 1 is inserted into a main body of the optical disk unit 4. When the optical disk medium 1 is inserted, first, the optical disk medium 1 is driven at step 1001. At step 1002, tracking adjustment is executed so that a laser beam can be irradiated to a track of the optical disk medium 1. At step 1003, control is given in order to lower the cutoff frequency of the filter 164 by changing the cutoff frequency from the FC1 value to the FC2 value.

After the cutoff frequency is lowered, a spacing of sectors is measured by detecting the cycle of a sector mark signal of an input ID signal at step 1004. After the sector spacing is measured, a sector spacing table is referenced at step 1005. One sector spacing table is created in association with of a storage capacity of, for example, 128M bytes or 230M bytes. The table is referenced to see which table contains a value agreeing with a measured sector spacing. Table 1 below is the table stored on the optical disk medium 1 having a storage capacity of 128M bytes, wherein zones, standard times coincident with one sector, minimum times coincident with one sector, and maximum times coincident with one sector are stored.

TABLE 1

Cycles of zones constituting 128 M bytes

| Zone | Standard time coincident with one sector ($\mu$s) | Minimum time coincident with one sector ($\mu$s) | Maximum time coincident with one sector ($\mu$s) |
|---|---|---|---|
| 128 M bytes | 889 | 815 | 978 |
| 0 | 741 | 718 | 814 |
| 1 | 694 | 674 | 717 |
| 2 | 654 | 636 | 673 |
| 3 | 617 | 601 | 635 |
| 4 | 585 | 571 | 600 |

TABLE 1-continued

Cycles of zones constituting 128 M bytes

| Zone | Standard time coincident with one sector (µs) | Minimum time coincident with one sector (µs) | Maximum time coincident with one sector (µs) |
| --- | --- | --- | --- |
| 5 | 556 | 543 | 570 |
| 6 | 529 | 517 | 542 |
| 7 | 505 | 494 | 516 |
| 8 | 483 | 473 | 493 |
| 9 | 463 | 417 | 472 |

At step 1006, it is judged from the table whether or not the optical disk medium 1 can contain 128M bytes. For example, if the inserted optical disk medium 1 can contain 230M bytes, control is passed to step 1007. If the optical disk medium has 128M bytes, control is passed to step 1017. The processing of step 1017 to be performed when the optical disk medium 1 has 128M bytes is the same as the one described below to be performed when the optical disk medium 1 can contain 230M bytes. The processing be performed when the optical disk medium 1 can contain 230M bytes will be described as a typical example.

At step 1007, the cutoff frequency is returned to the original value, that is, the cutoff frequency is changed from the FC2 value to the FC1 value. In this state, a reproduction frequency F associated with a zone inferred from a sector spacing measured at step 1004 is set at step 1008. At step 1009, a reproduced signal reproduced at the frequency F is read. At step 1010, it is judged whether or not an ID can be recognized at the frequency F. If an ID cannot be recognized, control is passed to step 1011. The frequency of raising or lowering the frequency F is calculated. At step 1012, it is judged whether or not the number of times of raising or lowering the frequency F equals to a given number of times. If the number of times of raising or lowering the frequency F does not reach the given number of times, control is passed to step 1013. The frequency F is raised or lowered, and then control is returned to step 1009. The number of times of raising or lowering the frequency F is determined according to a range from a maximum frequency associated with each zone in the aforesaid table to a minimum frequency associated with it, and to a value by which the frequency F is raised or lowered.

If an ID cannot be recognized by raising or lowering the frequency F a given number of times at step 1010, it is determined that the storage capacity of the optical disk medium 1 judged at step 1006 is incorrect. Control is then passed from step 1012 to step 1017. The processing to be performed when the storage capacity is 128M bytes is carried out.

By contrast, if an ID can be recognized by raising or lowering the frequency F at step 1010, control is passed to step 1014. A current track position is identified on the basis of the recognized ID information. In this embodiment, the current track position is not finalized through the identification of step 1014 but determined tentatively. At step 1015, the carriage is moved to a control zone of the optical disk medium 1 according to the tentatively-determined track. A signal written in the control zone is recognized. At step 1016, a track on which reproduction is under way is finalized.

FIG. 11 is a timing chart depicting the foregoing control, wherein (a) shows an ID signal, (f) shows a sector pulse signal, and (g) depicts the operation of the logic IC 166 shown in FIG. 7. A rectangular part of (a) is an envelope of an ID signal, which is shown in FIG. 9B(1), read from an ID division. (f) shows sector mark pulses of a sector mark signal shown in FIG. 9B(3). The logic IC 166 drives a gate signal high with the first sector mark pulse of the sector mark signal, and retains the gate signal at the high level while a predetermined count value CV is being counted down. While the gate signal remains high, the logic IC 166 ignores any leading edge of the sector mark signal. Thereafter, the logic IC 166 drives the gate signal high with the first pulse after an undefined duration U of the sector mark signal comes to an end, and retains the gate signal at the high level while a predetermined count value is being counted down.

A control program to be executed by the logic IC 166 measures the cycle of sector mark pulses by measuring the interval between leading edges of the gate signal, and then determines a zone number of a zone of the optical disk medium 1 in which reproduction is under way.

Next, an optical storage device of the second embodiment of the present invention will be described.

Figure 12:
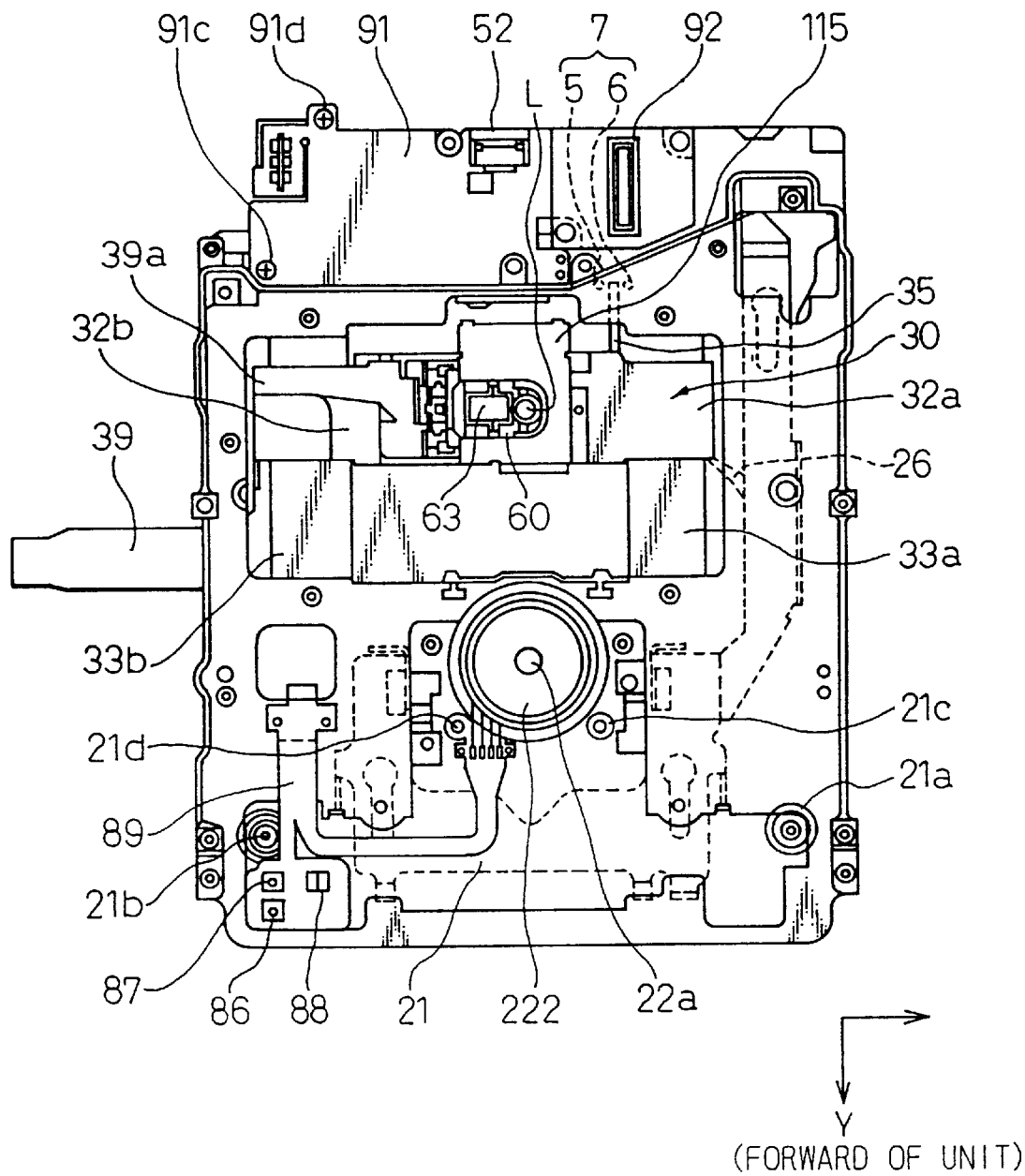
FIG. 12 is a schematic view of a major portion of the front side of an optical storage device of the second embodiment of the present invention.
Figure 13:
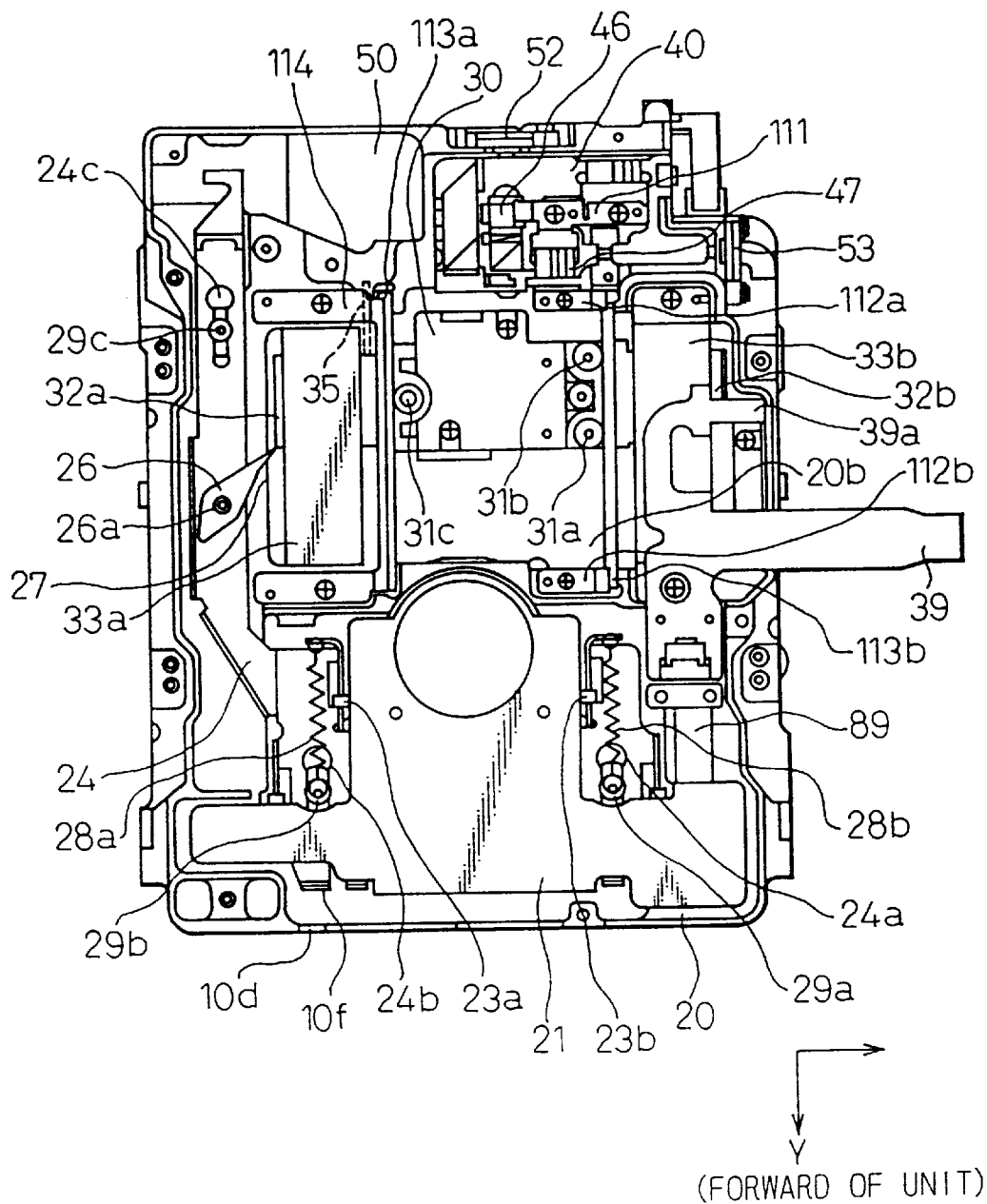
FIG. 13 is a schematic view of a major portion of the back side of the optical storage device of the second embodiment of the present invention.

FIG. 12 is a schematic view of the major portion of the front side of the optical disk unit described in conjunction with FIGS. 2A to 4 with the printed-circuit board 11, frame 12, and cover 13 removed. FIG. 13 is a schematic view of the major portion of the back side of the optical disk unit shown in FIG. 12.

On the lens carriage 30, a lens actuator 60 having an objective lens L and magnetic circuits for driving the lens are mounted. A flexible printed-wiring sheet 39a for introducing signals including a signal used to drive the lens actuator 60 in a focus direction or tracking direction is attached along the coil section 32a of the lens carriage 30 using an adhesive. Moreover, a carriage cover 115 made of a ferromagnetic material such as stainless steel is placed so that it can surround the objective lens L. Located at both edges of the lens carriage 30 are voice coil motors (VCM) for moving the lens carriage 30 in a radial direction of an optical disk. The VCMs are composed of the coil sections 32a and 32b of the lens carriage 30 and the magnetic circuits 33a and 33b each including yokes and magnet.

Guide rails 113a and 113b for facilitating the movement of the lens carriage 30 are secured while being pressurized by blade springs 112a, 112b, and 114. In other words, the blade springs 112a and 112b work as securing sides for securing the guide rail 113b by constraining the guide rail 113 to abut against the walls of the drive base 20 opposed to both ends of the guide rail 113b. The blade spring 114 pressurizes the guide rail 113a toward the guide rail 113b. The guide rails 113a and 113b are engaged with bearings 31a to 31c located on borders of the coil sections of the lens carriage 30.

Incidentally, the state of the lens carriage 30 shown in FIGS. 12 and 13 is a locked state. This is seen from the fact that a carriage lock 26 is abutting against the lens carriage 30. The carriage lock 26 prevents the lens carriage 30 from leaving a home position in the radial direction of an optical disk.

A boss 22a is located in the center of the turntable unit 222 jutting out through the opening 20a of the drive base 20, and fitted into a center hole in the hub of an optical disk. A flexible printed wiring sheet (FPC) 89 is attached to the plate 21 using an adhesive. A sensor 86 for detecting Write Enable set in an optical disk cartridge, a sensor 87 for detecting Write Protect set in an optical disk cartridge, and a cartridge in sensor 88 for detecting insertion of an optical disk cartridge are mounted on the FPC 89.

Incidentally, a 3.5-inch magneto-optical disk cartridge having a storage capacity of 128M bytes is conformable to the ISO/IEC10090 standard, while the one having a storage capacity of 230M bytes is conformable to the ISO/IEC13963 standard. These kinds of disk cartridges are already on the market. An optical disk cartridge will therefore not be illustrated in particular. Furthermore, an end of the FPC 89 is connected to a connector mounted on the FPC 39 for transmitting a signal used to control the movements of the lens carriage 30 and lens actuator 60. The FPC 39 is routed along a lateral side of the drive base 20, and bent to be connected to a connector placed on a printed-circuit board.

A slide plate 24 is placed under the plate 21, that is, between the drive base 20 and plate 21. When the slide plate 24 moves in a back-and-forth direction Y of the unit, the relative positions of locating pins 29a to 29c located on the drive base 20 in relation to a plurality of grooves 24a to 24c formed on the slide plate 24 change. The slide plate 24 moves backward with an eject instruction, whereby an optical disk cartridge is disengaged from the optical disk unit. Thereafter, the slide plate 24 is moved forward of the optical disk unit by the elastic force exerted by coil springs 28a and 28b whose one ends are joined with the slide plate 24 and whose the other ends are joined with the fit pins 29a and 29b respectively, and thus returned to the original position quickly.

The eject instruction may be issued by pressing an eject button 10a located on a front bezel 10 or by putting a pin or the like into a manual eject hole 10d forcibly. In the former case, when the eject button 10a is pressed, an eject motor 50 is driven. When an edge 24d of the slide plate 24 is pulled, the slide plate 24 moves backward of the optical disk unit. In the latter case, when a pin or the like is put into the manual eject hole 10d forcibly, the pin collides against an erect wall 10f of the slide plate 24. This causes the slide plate 24 to move backward in the optical disk unit.

A blade spring 111 is fixed to a stationary optical unit 40 located at the back of the drive base 20. The blade spring 111 presses an M lens 46 and S lens 47 against surrounding walls of the drive base 20 and thus secures them. A photodetector 52 and photodetector 53 are fitted into stowage sections of the drive base 20. The photodetector 52 detects a reproduced data signal sent from an optical disk using returned light guided by the lens carriage 30 serving as a movable optical unit. The photodetector 53 detects a focus servo control signal and tracking servo control signal. Reference numerals 23a and 23b denote slide pins of the plate 21. 91 denotes an FPC. 91c and 91d denote screw holes. 92 denotes a plug-in connector.

Figure 14A:
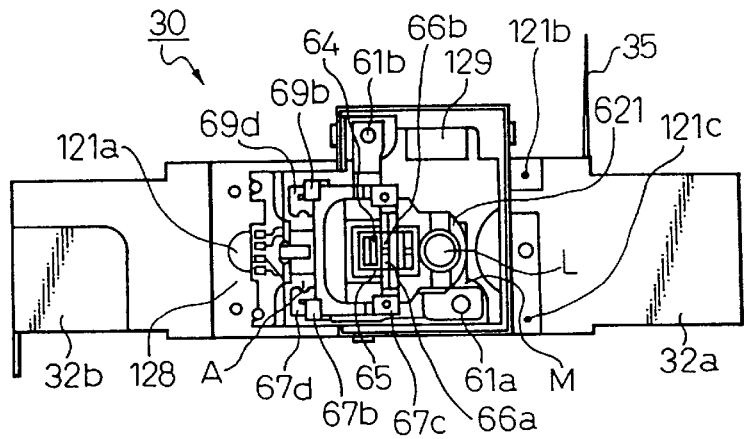
FIG. 14A is a top enlarged plan view of a lens carriage.
Figure 14B:
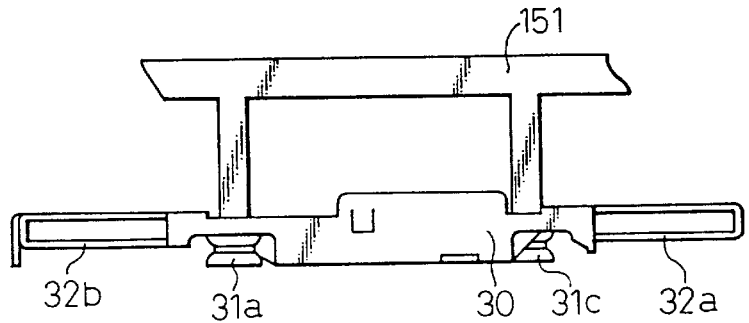
FIG. 14B is a side enlarged plan view of the lens carriage.
Figure 14C:
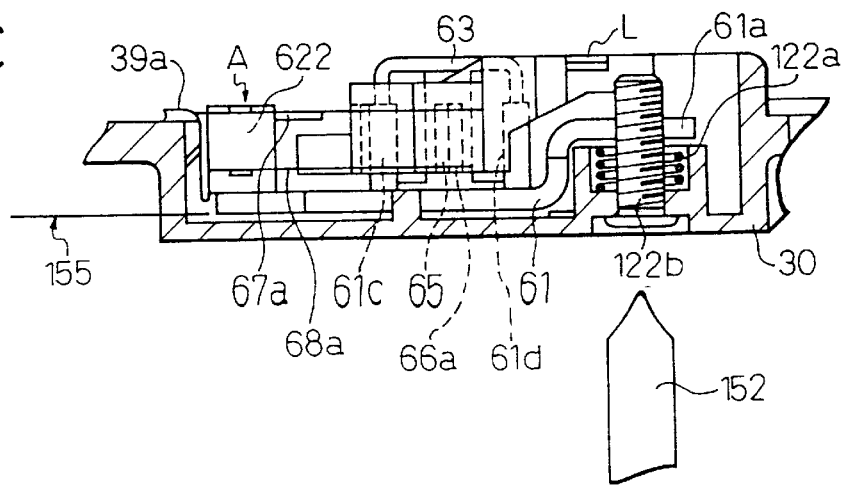
FIG. 14C is a sectional enlarged plan view of the lens carriage.

FIG. 14A is an enlarged plan view showing the lens carriage 30 from above. FIG. 14B is an enlarged side view. FIG. 14C is an enlarged sectional view. Referring to FIGS. 14A to 14C, there are shown bearings 31a to 31c, coil sections 32a and 32b, an FPC 39a, an actuator base 61, screw attachments 61a and 61b, yokes 61c, 61d, and 63, a focus coil 65, tracking coils 66a and 66b, wires 67a and 68a, terminal plates 67b, 67c, 67d, and 69d, reference ditches 121a to 121c, a coil spring 122a, a screw 122b, a condenser lens 129 for receiving or irradiating a light beam from or to the stationary optical unit 40, a driver 152, a lens holder 621, a wire holder 622, and an objective lens L. An arrow A shows a pre-load.

In the lens carriage 30 having the foregoing components, in this embodiment, an interceptive projection 35 extending in a direction parallel to a movement direction of the carriage 30 is located at an edge of the carriage 30 away from a spindle motor for rotating an optical disk medium. The interceptive projection 35 is illustrated in FIGS. 12 and 13.

Moreover, in this embodiment, a photosensor 7 composed of a light emitting device 5 and light receiving device 6 is placed across a movement trajectory which the interceptive projection 35 traces with the movement of the carriage 30. The photosensor 7 is located at a position where light incident to the photosensor 7 is intercepted by the interceptive projection 35 only during a period during which the carriage 30 is located in a laser output adjustment area defined in the vicinity of the outer circumference of the optical disk medium 1. In the optical disk unit according to the second aspect, therefore, it is detected whether or not light incident to the photosensor 7 is intercepted by the interceptive projection 35. It is thus detected whether or not the carriage 30 has moved to the laser output adjustment area defined on the optical disk medium 1. The laser output adjustment area is used to adjust the laser output or the intensity of a laser beam to be irradiated to the optical disk medium 1, and is normally defined on the outer circumference of the optical disk medium 1 so that data zones of the optical disk medium 1 will not be affected adversely.

An amount of light of a laser beam emanating from the stationary optical unit 40 in the optical disk unit is fixed to a certain level. Unless the amount of light reaches the level, the optical disk unit does not operate. It is therefore necessary for the optical disk unit to detect an amount of light of a laser beam when the power supply is turned on. If a laser beam is checked in a data zone of the optical disk medium 1 in order to detect the amount of light of the laser beam, there arises the fear of erasing data. Detecting an amount of light of a laser beam is therefore carried out with the carriage 30 located in the laser output adjustment area defined on the outermost circumference of the optical disk medium 1. The carriage 30 must therefore be offset to lie in the laser output adjustment area defined on the outermost circumference of the optical disk medium 1 immediately after the power supply of the optical disk medium 1 is turned on.

Figure 15A:
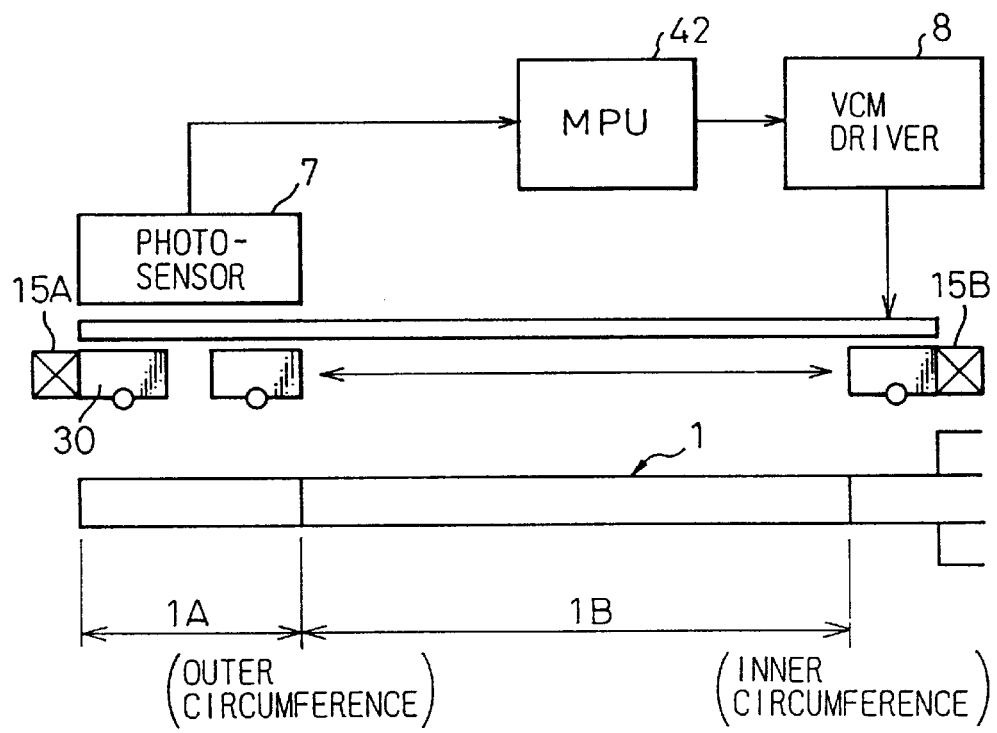
FIG. 15A is a diagram showing the relationship between the laser output adjustment area of an optical disk medium and the position of a photosensor for the purpose of explaining the laser output adjustment area for a laser diode.
Figure 15B:
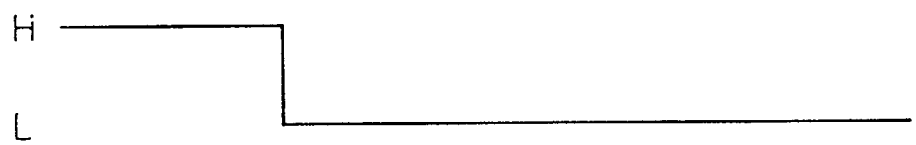
FIG. 15B is a waveform diagram showing an output signal of the photosensor shown in FIG. 15A.

FIGS. 15A and 15B are diagrams for explaining the laser output adjustment area for a laser diode. FIG. 15A shows the relationship between the laser output adjustment area on an optical disk medium and the position of a photosensor. FIG. 15B shows an output signal of the photosensor.

Referring to FIG. 15A, there is shown an optical disk medium 1. The left hand of the drawing is an outer circumferential side, while the right hand thereof is an inner circumferential side. A given area on the outermost circumferential side of the optical disk medium 1 is a laser output adjustment area 1A used to adjust the output of a laser diode whose light is irradiated to the optical disk medium 1 via the carriage 30. Inside the laser output adjustment area 1A, there is a data zone 1B including a plurality of tracks. The carriage 30 is guided by rails, which are not shown, running along both edges of the carriage 30, and driven by the VCM 15 to move in a radial direction of the optical disk medium 1. An outer stopper 15A is located on the outermost circumferential side of a movement range of the carriage 30, and an inner stopper 15B is located on the innermost circumferential side thereof.

As described previously, the photosensor 7 placed in a main body of the optical disk unit has incident light thereof intercepted by the interceptive projection 35 formed on the carriage 30 when the carriage 30 is located in the laser output adjustment area 1A for a laser diode defined on the optical disk medium 1. An output of the photosensor 7 is input to the MPU 42. Based on the output of the photosensor 7, the MPU 42 causes a current to flow into the VCM 15 via the VCM driver 8, and thus moves the carriage 30 in the radial direction of the optical disk medium 1.

FIG. 15B shows a waveform of an output signal of the photosensor 7. The output signal of the photosensor 7 goes high when the light receiving device has the incident light thereof intercepted by the interceptive projection 35 with the carriage 30 located in the laser output adjustment area 1A for the laser diode.

Next, a procedure for positioning the carriage 30 in the laser output adjustment area 1A for the laser diode for the purpose of adjusting the output of the laser diode or the intensity of laser light emanating from the stationary optical unit after the power supply of the optical disk unit is turned on, which is implemented in the optical disk unit including the carriage 30 that has the foregoing components but not have a position sensor, will be described in conjunction with the flowcharts of FIGS. 16A and 16B.

At step 1601, it is judged whether or not a position sensor is on. In this control procedure, the position sensor refers to the photosensor 7. The state in which the position sensor 7 is on is a state in which the photosensor 7 has incident light thereof intercepted by the interceptive projection 35 formed on the carriage 30. Judging first whether or not the position sensor 7 is turned on is intended to judge at which position on the optical disk medium 1 the carriage 30 lies. When the position sensor 7 is on, the carriage 30 has already been located at a position within the laser output adjustment area 1A for the laser diode. If the position sensor 7 is off, the carriage 30 is located in any area other then the laser output adjustment area 1A for the laser diode on the optical disk medium 1. A procedure for positioning the carriage 30 in the laser output adjustment area 1A for the laser diode according to whether or not the carriage 30 lies in the laser output adjustment area for the laser diode when the power supply of the optical disk unit is turned on will be described below.

(1) When the carriage 30 is located in the laser output adjustment area for the laser diode In this case, it is found at step 1601 that the position sensor 7 is on. Control is therefore passed to step 1602. A current I is applied to the VCM 15 by means of the VCM driver 8 in order to move the carriage 30 to the inner circumferential side of the optical disk medium 1. With the application of the current I, the carriage 30 moves toward the inner circumference of the optical disk medium 1. At step 1603, it is judged whether or not the position sensor 7 is turned off, that is, the carriage 30 has left the laser output adjustment area 1A for the laser diode. When the position sensor 7 is off, control is passed to step 1605. When the position sensor 7 is not turned off, control is passed to step 1604. At step 1604, the current I is increased. Control is then returned to step 1603. At step 1603, it is judged again whether or not the position sensor 7 is turned off.

At step 1605 to which control is passed when it is found at step 1603 that the position sensor 7 is turned off, a current i is applied to the VCM 15 by means of the VCM driver 8 in order to move the carriage 30 to the outer circumference of the optical disk medium 1. The polarity of the current i is opposite to that of the current I. With the application of the current i, the carriage 30 moves toward the outer circumference of the optical disk medium 1. At step 1606, it is judged whether or not the position sensor 7 is turned on, that is, the carriage 30 has entered the laser output adjustment area 1A for the laser diode. When the position sensor 7 is off, control is passed to step 1607. The current i is increased. It is judged again at step 1606 whether or not the position sensor 7 is turned on.

When it is found at step 1606 that the position sensor 7 is turned on, control is passed to step 1608. The value of the current i at that time is reserved as an interrupting current Aout. At step 1609, a current I is applied to the VCM 15 through the VCM driver 8 in order to move again the carriage to the inner circumference of the optical disk medium 1. The application of the current I causes the carriage 30 to move again toward the inner circumference of the optical disk medium 1. At step 1610, it is judged whether or not the position sensor 7 is turned off again. If it is found at step 1610 that the position sensor 7 is not turned off, control is passed to step 1611. The current I is increased and control is returned to step 1610. At step 1610, it is judged again whether or not the position sensor 7 is turned off.

If it is found at step 1610 that the position sensor 7 is turned off, control is passed to step 1612. The value of the current I at that time is reserved as a non-interrupting current Ain.

As mentioned above, when the power supply of the optical disk medium 1 is turned on, if the carriage 30 lies in the laser output adjustment area 1A for the laser diode, the carriage 30 is evacuated from the area temporarily. The value of the current i flowing when the carriage 30 enters the area again is stored as the interrupting current Aout. The value of the current I flowing when the carriage 30 comes out of the area immediately after entering the area is stored as the non-interrupting current Ain.

(2) When the carriage 30 is located outside the laser output adjustment area for the laser diode In this case, it is found at step 1601 that the position sensor 7 is off. Control is passed to step 1613. A current i is applied to the VCM 15 through the VCM driver 8 in order to move the carriage 30 to the outer circumference of the optical disk medium 1. The application of the current i causes the carriage 30 to move toward the outer circumference of the optical disk medium 1. At step 1614, it is judged whether or not the position sensor 7 is turned on, that is, the carriage 30 has entered the laser output adjustment area 1A for the laser diode. At step 1615, the current i is increased, and control is returned to step 1614. At step 1614, it is judged again whether or not the position sensor 7 is turned on.

If it is found at step 1614 that the position sensor 7 is turned on, control is passed to step 1616. A current I is applied to the VCM 15 through the VCM driver 8 in order to move the carriage 30 to the inner circumference of the optical disk medium 1. The polarity of the current I is opposite to that of the current i. The application of the current I causes the carriage 30 to move toward the inner circumference of the optical disk medium 1. It is judged at step 1617 whether or not the position sensor 7 is turned off, that is, the carriage 30 has comes out of the laser output adjustment area 1A for the laser diode. When the position sensor 7 is on, control is passed to step 1618. The current I is increased. It is judged at step 1617 whether or not the position sensor 7 is turned off.

If it is found at step 1617 that the position sensor 7 is turned off, control is passed to step 1619. The value of the current I at that time is reserved as an interrupting current Ain. At step 1620, the current i is applied to the VCM 15 through the VCM driver 8 in order to move the carriage to the outer circumference of the optical disk medium 1. The application of the current i causes the carriage 30 to move toward the outer circumference of the optical disk medium 1. At step 1621, it is judged whether or not the position sensor 7 is turned on again. If the position sensor 7 is not turned on, control is passed to step 1622. The current i is increased. At step 1621, it is judged whether or not the position sensor 7 is turned on.

If it is found at step 1621 that the position sensor 7 is turned on, control is passed to step 1623. The value of the current i at that time is reserved as an non-interrupting current Aout.

As mentioned above, when the power supply of the optical disk medium 1 is turned on, if the carriage 30 lies outside the laser output adjustment area 1A for the laser diode, the carriage 30 is moved into the laser output adjustment area 1A for the laser diode temporarily. The value of the current I flowing when the carriage 30 comes out of the area again is stored as the interrupting current Ain. The value of the current i flowing when the carriage 30 enters the area immediately after coming out of the area is stored as the non-interrupting current Aout.

After the interrupting current Ain and non-interrupting current Aout flowing when the carriage 30 lies inside the laser output adjustment area for the laser diode and those flowing when the carriage 30 lies outside it are thus measured, control is passed to step 1624. Average values of the interrupting currents Ain and non-interrupting currents Aout are computed as holding current values Ahld. At step 1625, the holding current values Ahld are set in the VCM driver 8. Using the holding current values Ahld, the carriage 30 can be locked while being offset to lie in the laser output adjustment area for the laser diode.

The reason why the values of currents flowing when the carriage 30 reciprocates are measured and averaged is that a current can be varied coarsely in steps and an operating time can eventually be shortened. Another reason is that a current to be varied is different with a direction in which the carriage 30 is moved.

Figure 16A:
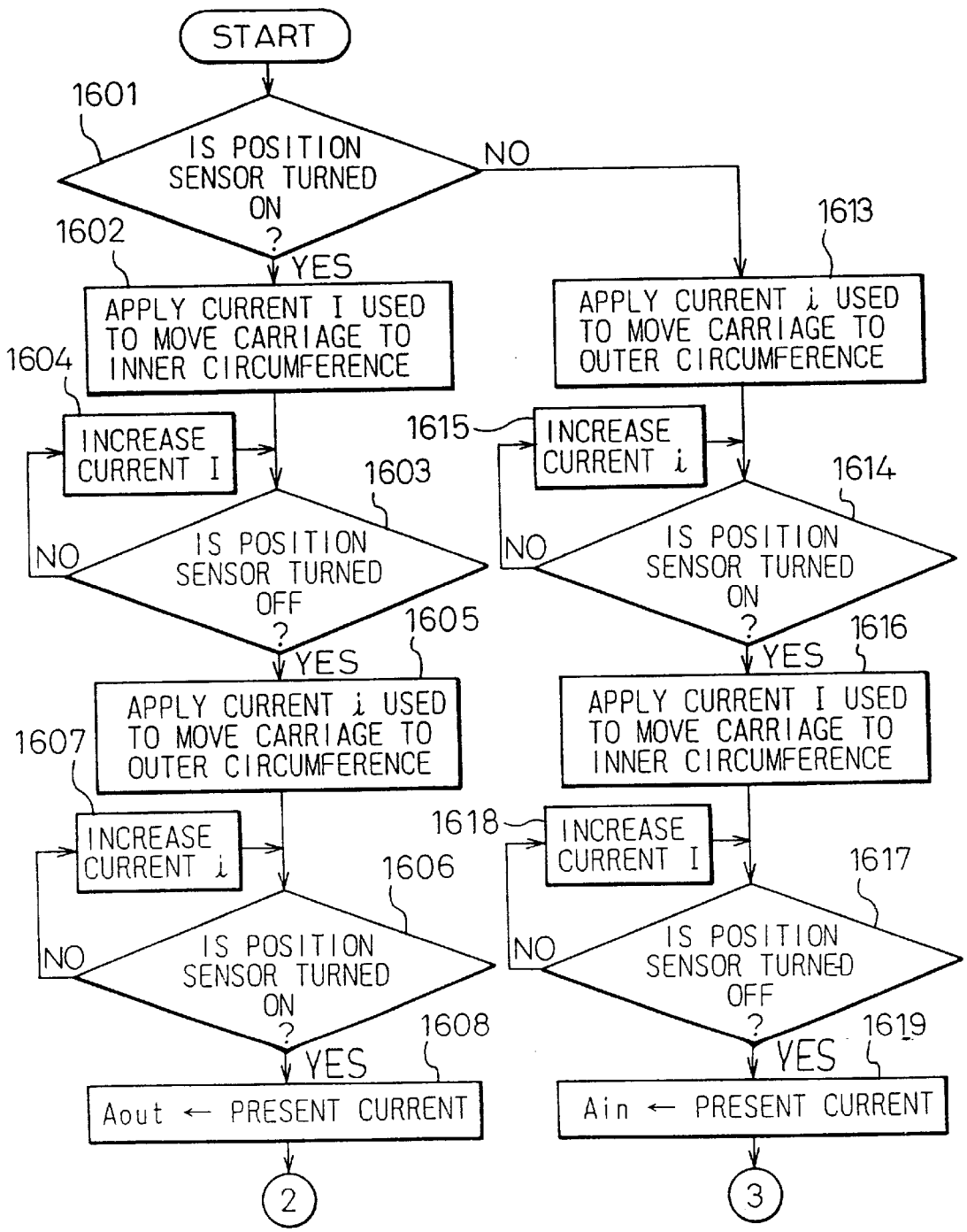
FIGS. 16A and 16B are flowcharts describing an example of current control for a VCM.
Figure 16B:
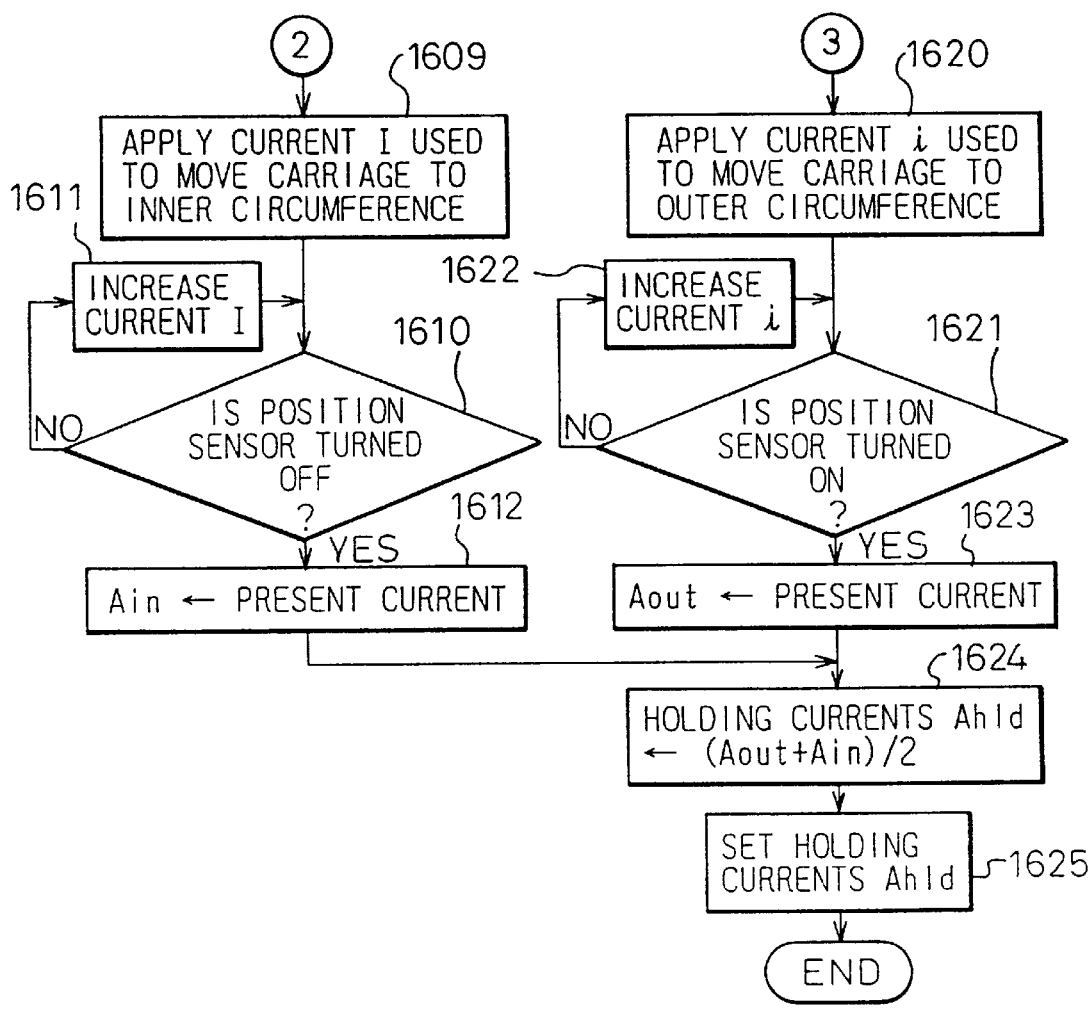

The processing described in conjunction with FIGS. 16A and 16B is carried out when the optical disk unit is placed horizontally. By contrast, when the optical disk unit is tilted, for example, the optical disk unit is tilted toward the outer circumference of an optical disk medium, if the carriage 30 is located on the inner circumference of the optical disk medium, the aforesaid processing poses problems. According to the aforesaid processing, even if the optical disk unit was tilted, a current used to move the carriage 30 toward the outer circumference of an optical disk medium on the assumption that the optical disk unit is placed horizontally were set. Since the slope of the optical disk unit would act on the current, the carriage 30 might be accelerated toward the outer circumference of the optical disk medium and collide against an outer stopper 15A.

In this case, the carriage 30 rebounds toward the inner circumference of the optical disk medium because of an impulse deriving from the collision against the outer stopper 15A. Eventually, the position sensor 7 is turned on and off for a short period of time. This may make it impossible to precisely set a holding current Ahld. In this case, since a precise holding current Ahld cannot be obtained, the carriage 30 cannot be held still. The carriage 30 halts while abutting against the outer stopper 15A.

For overcoming the above problem, a process is added: a difference Adif between the measured interrupting current Ain and non-interrupting current Aout is computed; and when the difference Adif becomes equal to or smaller than a certain value, the interrupting current Ain and non-interrupting current Aout are measured again. This example of control will be described using the flowchart of FIG. 17. The processing from step 1601 to step 1623 is identical to the procedure described in conjunction with FIGS. 16A and 16B. The description of the processing will be omitted.

Figure 17:
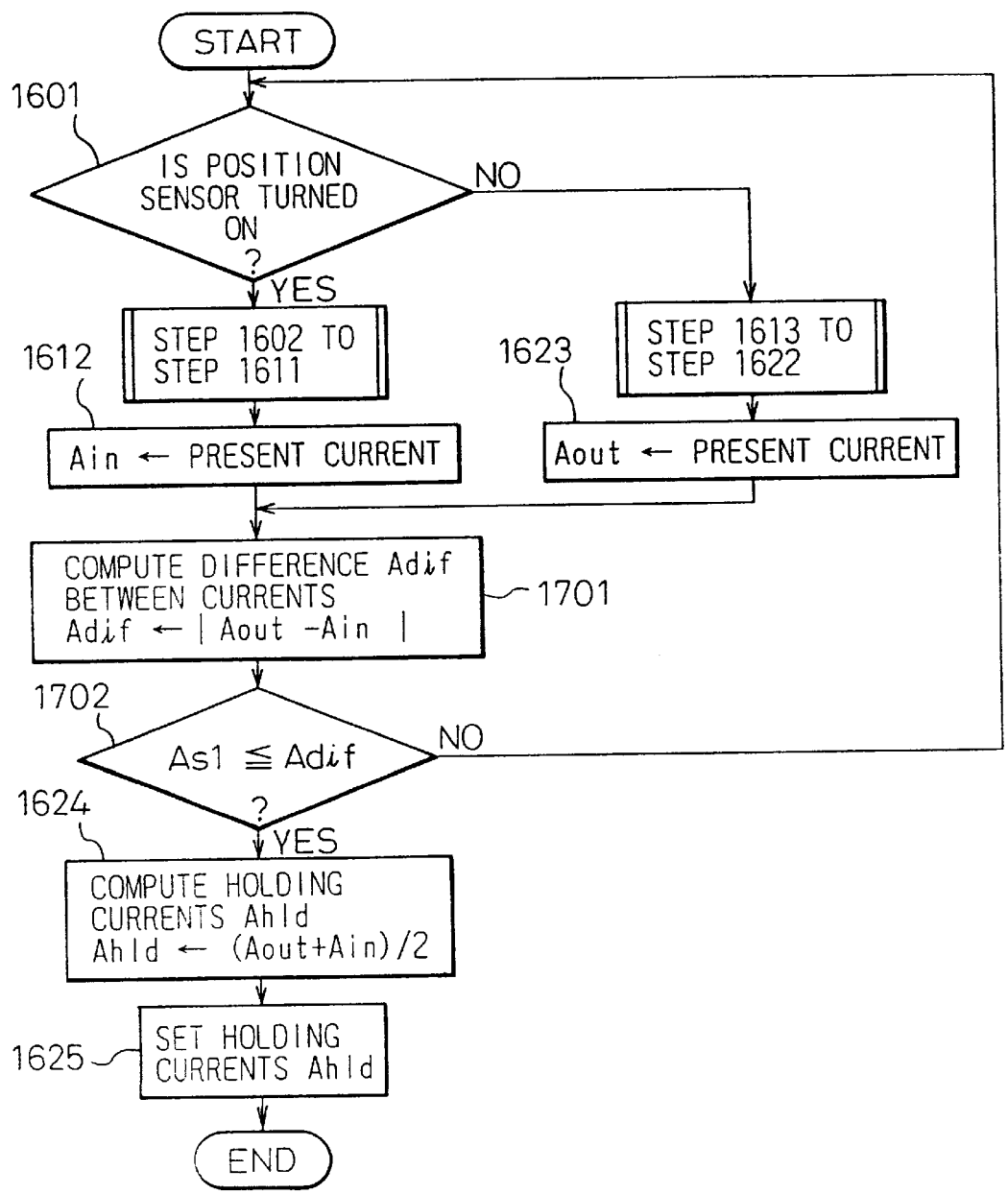
FIG. 17 is a flowchart describing an example of current control for the VCM.

When step 1612 or 1623 of the processing described in FIGS. 16A and 16B is completed, control is passed to step 1702 of the processing in FIG. 17. At step 1702, the difference Adif (absolute value) between the measured interrupting current Ain and non-interrupting current Aout is calculated. At step 1702, it is judged whether or not the difference Adif is equal to or larger than a given reference value As1. If the As1 value is larger than the Adif value, control is returned to step 1601. The processing from step 1601 to 1623 is repeated. By contrast, if it is found at step 1702 that the As1 value is equal to or smaller than the Adif value, control is passed to step 1624. An average of the interrupting current Ain and non-interrupting current Aout is computed as a holding current Ahld. At step 1625, the value of the holding current Ahld is set in the VCM driver 8. With the holding current Ahld, the carriage 30 can be locked while being offset to lie in the laser output adjustment area for the laser diode.

The reason why the foregoing processing is carried out is that when the optical disk unit is tilted toward the outer circumference of an optical disk medium, since the carriage 30 turns on and off the position sensor 7 for a short period of time, a difference between measured currents becomes smaller than a difference between normally-measured currents. Incidentally, since the carriage 30 is located at a position at which the position sensor 7 is on, the second measurement can be executed without any problem.

FIG. 18 shows an example of the current control for the VCM described in conjunction with FIGS. 16A and 16B, wherein when the power supply of the optical disk unit is turned on, the output of the position sensor 7 is high. In FIG. 18, a current to be applied to the VCM and the output signal of the photosensor 7 are plotted with respect to time. In FIG. 18, time interval (a) coincides with step 1601 to step 1604, time instant (b) coincides with step 1605, time interval (c) coincides with step 1606 to 1607, time instant (d) coincides with step 1608, time interval (e) coincides with step 1609 to step 1611, and time instant (f) coincides with step 1612.

Figure 19A:
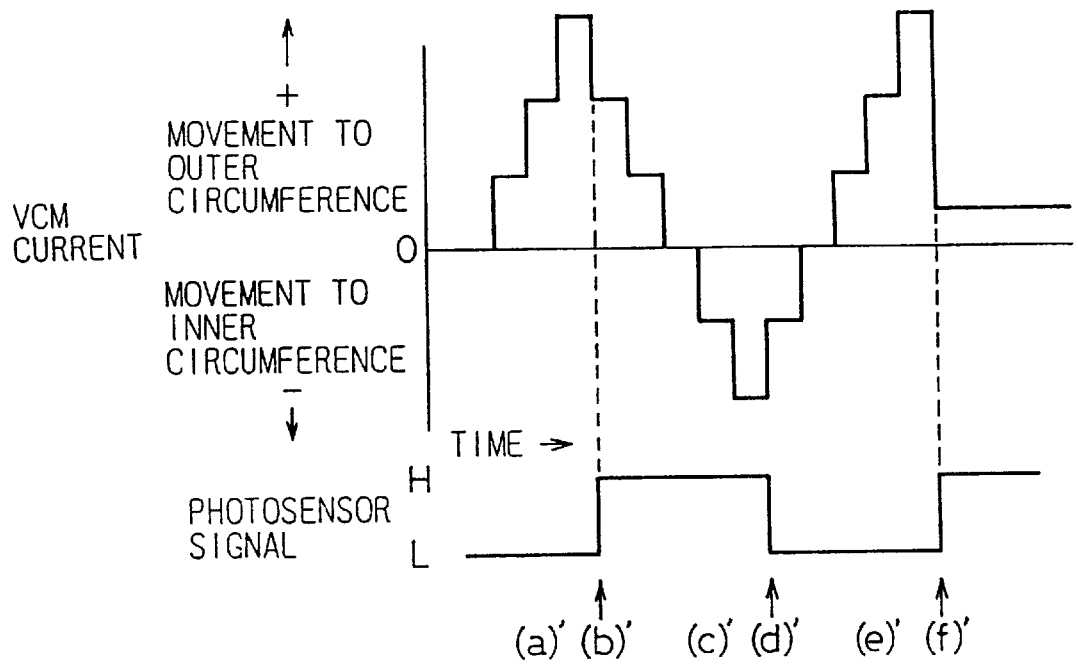
FIG. 19A is a waveform diagram relating to an example of current control for the VCM performed when the output of the position sensor is low and showing the current in the VCM and the wave of the photosensor signal.

FIG. 19A shows an example of the current control for the VCM described in conjunction with FIGS. 16A and 16B, wherein when the power supply of the optical disk unit is turned on, the output of the position sensor 7 is low. In FIG. 19A, a current to be applied to the VCM and the output signal of the photosensor 7 are plotted with respect to time. Time instant (b)' coincides with step 1616, time interval (c)' coincides with step 1617 to 1618, time instant (d)' coincides with step 1619, time interval (e)' coincides with step 1620 to step 1622, and time instant (f)' coincides with step 1623.

Figure 19B:
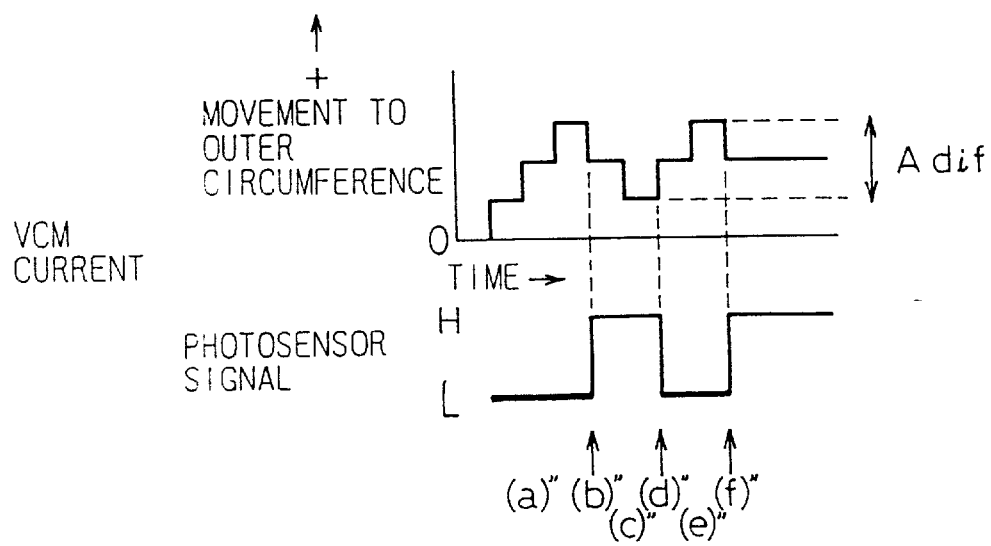
FIG. 19B is a waveform diagram relating to an example of current control for the VCM performed when a carriage collides against an outer stopper and showing the current in the VCM and the wave of the photosensor signal.

FIG. 19B shows an example of the current control for the VCM described in conjunction with FIG. 17, wherein when the power supply of the optical storage device is turned on, the output of the position sensor 7 is low. In this case, the output of the photosensor 7 is driven high at time instant (b)". However, since the carriage 30 collides with the outer stopper 15A and rebounds, the output signal of the photosensor 7 is reversed at time instant (d)". In this case, the processing described in FIG. 19A can be carried out after time instant (f)".

Next, an optical storage device of the third embodiment of the present invention will be described. Prior to the optical storage device, a conventional lens actuator will be described briefly.

In an optical disk unit, a carriage having an objective lens mounted thereon is moved in a radial direction of an optical disk medium by means of a VCM. A tracking actuator for inching the objective lens within the carriage is interlocked with the VCM, whereby any track is accessed (seek). The conventional carriage therefore includes a position sensor for detecting the position of the carriage and a lens position sensor for detecting the position of the objective lens on the carriage.

However, an optical storage device of the present invention is devoid of a position sensor and a lens position sensor because the optical storage device is made thinner.

Figure 20:
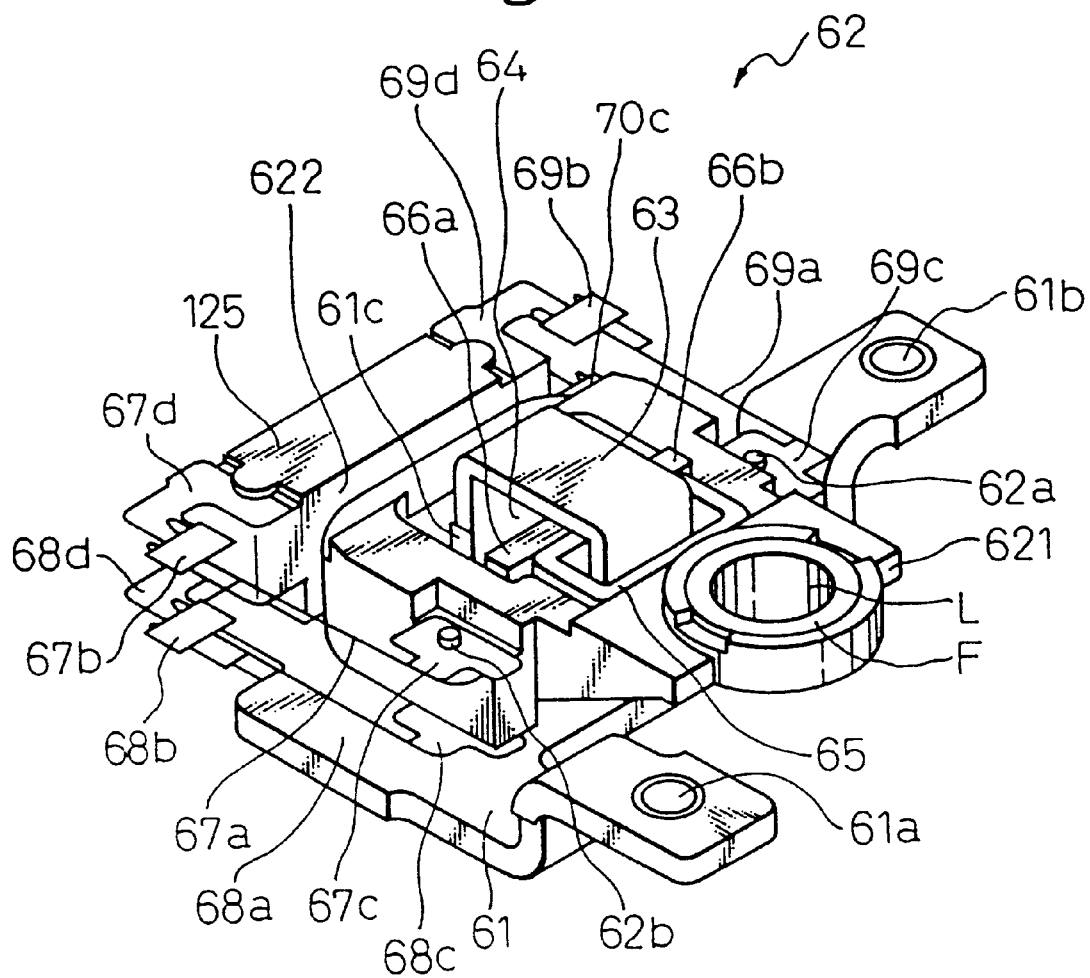
FIG. 20 is an enlarged oblique view of a lens actuator in an optical storage device of the third embodiment of the present invention.

FIG. 20 is an enlarged view of a lens actuator 62 mounted on a carriage. A movable part of the actuator 62 is composed of a lens holder 621, a focus coil 65, and tracking coils 66a and 66b. The lens holder 621 is made of a thermosetting resin or the like so that an objective lens L can be held movably in a tracking direction or focus direction. The focus coil 65 is attached to a wall of a center opening of the lens holder 621 using an adhesive. The tracking coils 66a and 66b are attached to a surface opposed to the wall, to which the focusing coil 65 is attached, using an adhesive.

Moreover, the two tracking coils 66a and 66b abutting on the left- and right-hand parts of one side of the focus coil 65 are wound in a direction substantially perpendicular to the plane of winding of the focus coil 65. One end of each of the tracking coils 66a and 66b juts out from the edge of a yoke 63 constituting a magnetic circuit on the right and left sides of the yoke. In other words, parts of the tracking coils 66a and 66b from which magnetic fluxes expand vertically are located outside the magnetic circuit, so that the tracking coils will not be affected by another magnetic flux. Control is thus given in order not to cause mechanical oscillations.

The magnetic circuit of the actuator 60 is composed of a magnet 64, a yoke 61c, a yoke 61d (See FIG. 14C), and a cover yoke 63. The magnet 64 is placed on an actuator base 61 so that the magnet 64 will be opposed to the tracking coil 65 in the center opening of the lens holder 621 constituting the movable part of the actuator 62. The yoke 61c includes the bent part of the actuator base 61 for receiving a magnetic force of the magnet 64. The yoke 61d that is not shown has the bent part thereof opposed to the yoke 61c. The cover yoke 63 is shaped like a letter U in order to link the yokes 61c and 61d.

The lens actuator 62 further comprises four wires 67a, 68a, 69a, and one other (the one wire is not shown), four damping members 67d, 68d, 69d, and one other (the one member is not shown), and four terminal plates 67d, 68d, 69d, and one other (the one plate is not shown). The four wires 67a, 68a, 69a, and one other (one wire is not shown) hold the movable part of the actuator 62. The four terminal plates 67c, 68c, 69c, and one other (one plate is not shown) are attached using an adhesive with the holes thereof engaged with bosses 62a and 62b of the lens holder, and hold the ends of the wires on the side of the objective lens. The four terminal plates 67c, 68c, 69c, and the other (one plate is not shown) are attached to a wire holder engaged with an edge of the actuator base 61 using an adhesive. The four damping members 67b, 68b, 69b, and one other (one member is not shown) are used to absorb the vibrations of the wires.

An end of an FPC 39c is extended to the wire holder 622 and soldered to the four terminal plates on the wire holder 622. The four terminal plates on the lens holder 621 are soldered to the two leads of each of the focus coil 65 and the tracking coils 66a and 66b. The focus coil 65, the tracking coils 66a and 66b, and the FPC 39a are thus connected. Electrical connections are thus achieved without the necessity of leading out thin leads of the coils. There is therefore no fear of disconnection. Consequently, reliability can be improved.

Furthermore, the four wires and the terminal plates located on both edges of the wires are produced by pressure on a blade spring material or linear spring material using a pair of dies (U-shaped) defining a state in which two right and left wires are linked. The two right and left wires are then mounted in the wire holder 622 with them linked mutually (in the letter-U shape). Thereafter, the linkage is cut out. The use of the thus produced wire assembly simplifies handling or management of small parts and improves assembling efficiency.

The actuator base 61 is screwed to the lens carriage 30 through attachment sections 61a and 61b formed in the bent fragments of the actuator base 61 with all the parts of the actuator 62 mounted thereon.

In the lens actuator 62 having the aforesaid components, a VCM plays a pivotal role in moving the objective lens L during coarse control or seek control. What is important in seek control is to approximate a speed at which the fine control moves the objective lens to the closest possible value of 0. What is required to control the seek speed so that the final speed will be 0 is to measure the seek speed precisely. The seek speed can be measured using a zero-crossing pulse generated when the objective lens L traverses a track. A higher speed can be calculated using the number of pulses sampled during a unit time. A lower speed can be calculated using a pulse spacing. In either case, a signal used to measure the speed is a tracking error signal.

The objective lens L is moved onto a VCM carriage by a system whose degree of freedom is 2, that is, a tracking actuator. It cannot generally be said that "the tracking error signal represents a value equal to a function of the position of a VCM." The tacking error signal always contains a component indicating the position of a lens within the carriage (that is, an output of a lens position sensor). In case the carriage is accelerated greatly so that it will be moved at a high speed during seek or the like, it is predicted that the lens shifts greatly on the carriage because of an inertia. The tracking error signal therefore-represents a value equal to a function of the combination of the position of the VCM and the output of the lens position sensor.

When the lens position sensor is used, control of locking the lens on the carriage, so-called "lens lock servo control" can be executed using an output signal of the lens position sensor. In this case, it is true that "the tracking error signal represents a value equal to a function of the position of the VCM."

In an optical storage device with neither a position sensor nor a lens position sensor, a lens is locked on a carriage according to the following method (1) or (2) :

(1) the lens is accelerated at the same acceleration as that at which the carriage is, thus preventing occurrence of a relative shift; or (2) the carriage is moved so slowly that the lens will not swing.

However, control (1) poses a problem that since the acceleration performance is different between an actuator and a VCM, even if the same current is applied to the actuator and VCM, the actuator and VCM may not provide the same acceleration. Control (2) poses a problem that since a seek time increases, the increase may affect access to a track.

The third embodiment, therefore, realizes a control system in which "components in a high-frequency band causing an increase in difference of acceleration performance from that of an actuator will not be included and a seek time will not be increased." In short, the third embodiment performs structural-vibration minimized acceleration trajectory (SMART) control that minimizes structural vibrations.

The SMART control is adopted as a control system, which hardly excites vibrations induced by a high-frequency band in an object of control, in an effort to, for example, in the field of a magnetic disk unit, cope with the secondary resonance of a magnetic head caused by seek control. The SMART control is such that occurrence of the residual vibration (1 to 2 kHz) of a supporting spring which cannot be controlled fully by fine control of the magnetic head (which treats a frequency band of several hundreds frequencies) is suppressed even during seek control. That is to say, control to be given is not intended to suppress generated vibrations but intended to present a target acceleration trajectory not exciting vibrations.

Since the lens actuator 62 shown in FIG. 20 does not have a lens position sensor, a lens position signal cannot be produced. The VCM is therefore controlled according to the SMART control system that minimizes structural vibrations, so that when the carriage is moved, a pulse triggering abrupt acceleration or deceleration will not be applied to the VCM to the greatest extent.

Consider the VCM as a motion model. The equation of motion is expressed as follows:

$$m*d^2x(t)/dt^2=(B1)*i(t)$$

where x(t) indicates the position of the VCM and i(t) indicates a coil current. When the position and speed of the VCM are used as magnitudes of a state, the equation of state is given as follows:

$$x(t)=Ax(t)+bi(t)$$

where x(t) indicates the position of the VCM. When rewritten, the equation of state becomes as follows:

$$x(t) = \begin{bmatrix} x(t) \\ x(t) \end{bmatrix}$$

$$A = \begin{bmatrix} 0 & 1 \\ 0 & 0 \end{bmatrix}, b = \begin{bmatrix} 0 \\ B1/m \end{bmatrix}$$

Assuming that the environmental conditions for the model are expressed as follows:

$$x(0) = \begin{bmatrix} 0 \\ 0 \end{bmatrix} \quad X(T) = \begin{bmatrix} L \\ 0 \end{bmatrix}$$

a target trajectory in acceleration trajectory control is given by function x(t) that minimizes the following performance function:

$$I\{x(t)\} = \int_0^T \{d\,i(t)/d\,t\}^2 dt$$

In other words, function x(t) that "minimizes a variation of a current to be applied to the VCM within a seek time" defines an acceleration trajectory effective in minimizing structural vibrations. That is to say, the SMART control minimizing structural vibrations can be considered to be the control system discussed below.

(1) Assuming that a seek time is T, (2) a current profile i(t) defining a current that does not, if possible, contain any high-frequency component is set.

A procedure of solving the above expression according to the calculus of variations is not included in the gist of the present invention. The detailed solving procedure will be omitted and a solution alone will be presented.

Figure 21A:
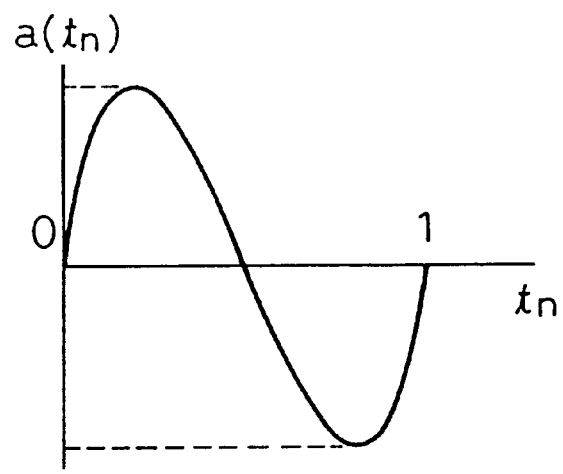
FIG. 21A is a characteristic graph showing a target profile representing the acceleration of the VCM.
Figure 21B:
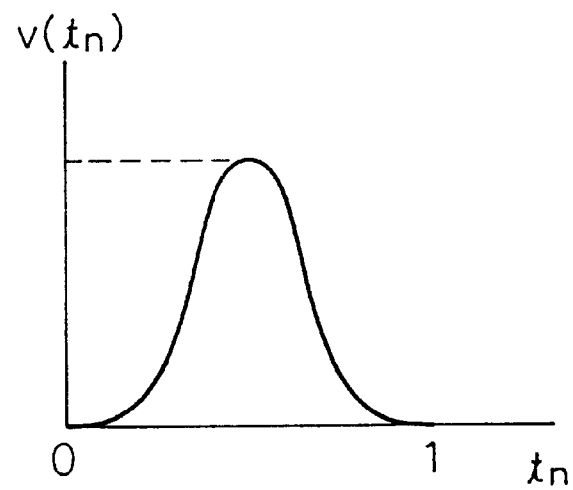
FIG. 21B is a characteristic graph showing a target profile representing the speed of the VCM.
Figure 21C:
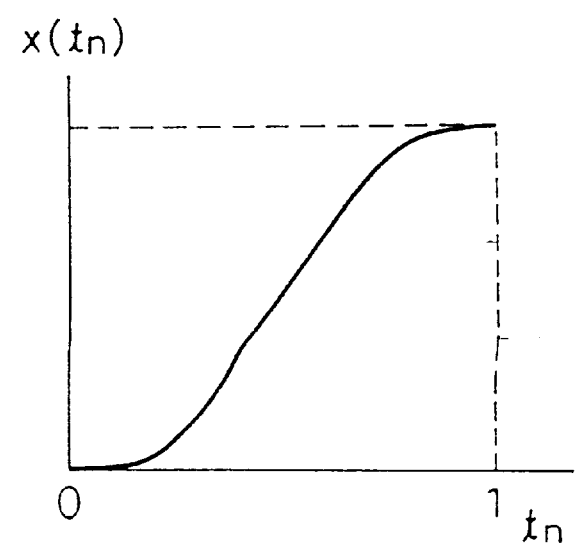
FIG. 21C is a characteristic graph showing a target profile representing the position of the VCM.

Assuming that a time t is normalized by a seek time T. solutions are provided, such as the expressions below, where a(tn) is an acceleration, x(tn) is a speed, x(tn) is a position, and tn=t/T is established. Target driving profiles are shown in FIGS. 21A to 21C. Specifically, FIG. 21A shows a driving profile on an acceleration, FIG. 21B shows a driving profile on a speed, and FIG. 21C shows a driving profile on a position.

$$a(tn)=L/T^{2}*\{120tn^3-180tn^2+60th\}$$

$$v(tn)=L/T*\{30tn^4-60tn^3+30tn^2\}$$

$$x(tn)=L*\{6^3-15tn^4+10tn^3\}$$

Thus, the target driving profiles can be expressed in relatively simple polynomials. It is very possible to calculate the polynomials using a digital signal processor (DSP). Taking a seek operation of a carriage for instance, a target acceleration and target speed are computed on the basis of the position of the carriage and a distance by which the carriage is moved during the seek operation. A seek current based on the results of computation is then supplied to a VCM.

Finally, an optical disk unit of the fourth embodiment of the present invention will be described. Prior to the optical disk unit, lens lock by the conventional lens actuator will be described briefly in conjunction with FIG. 22B.

Figure 22A:
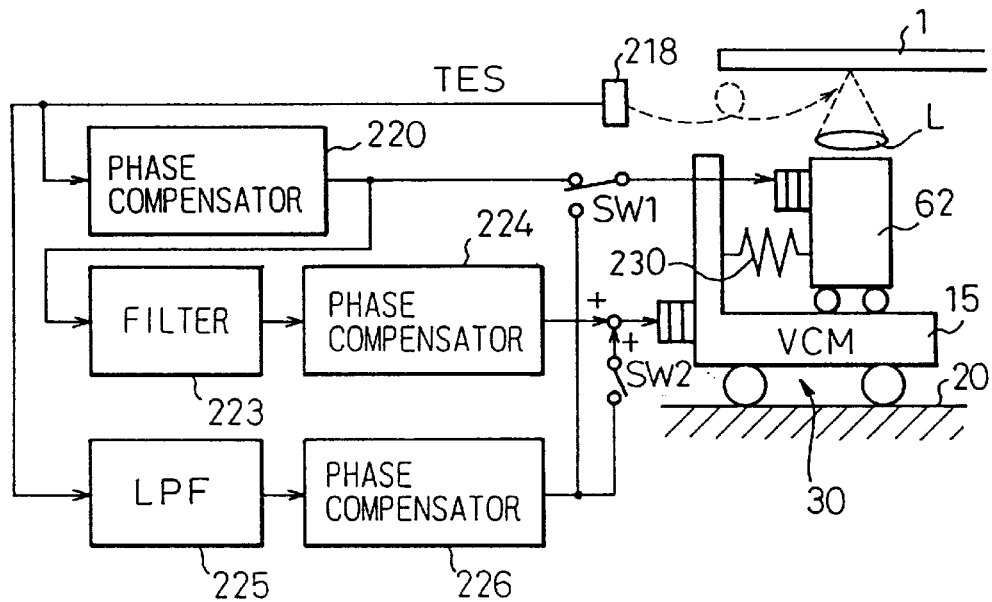
FIG. 22A is a schematic configuration diagram showing the configuration of an optical storage device of the fourth embodiment of the present invention.
Figure 22B:
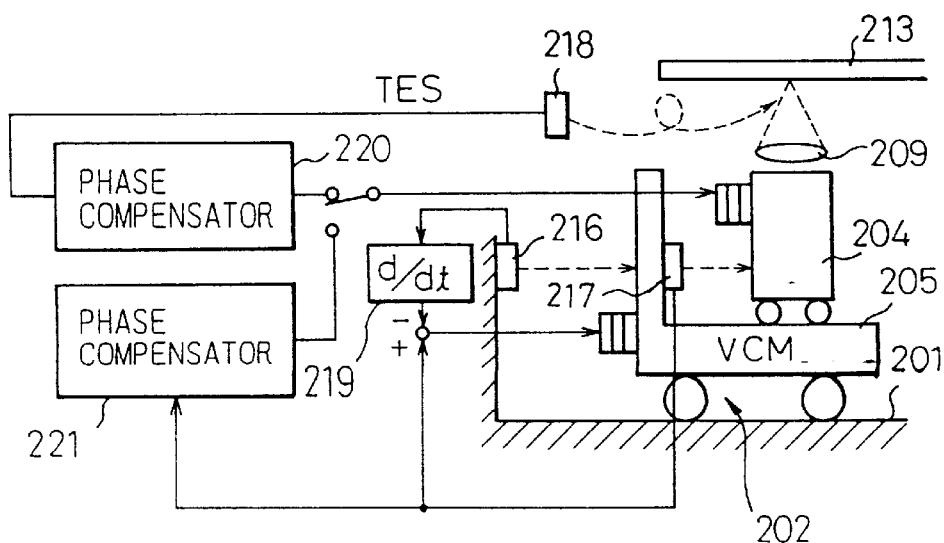
FIG. 22B is a schematic configuration diagram showing the configuration of a conventional optical storage device.

FIG. 22B shows the configuration for controlling the conventional lens actuator. Referring to FIG. 22B, there are shown a base 201, a carriage 202, a lens actuator 204, a VCM 205, an objective lens 209, an optical disk medium 213, a position sensor 216, a lens position sensor 217, a photodetector 218, a differential circuit 219, and phase compensators 220 and 221.

In an optical disk unit, tracking control is carried out relative to a track groove so that the objective lens 209 can irradiate a light spot on an intended track of the optical disk medium 213. A feedback loop for giving a final value of 0 to a tracking error signal provided by the photodetector 218 is constructed. Incidentally, the tracking error signal contains noise deriving from any of the following adverse effects:

(1) offsets of a spindle motor and the optical disk medium 213, (2) an error of the position of a track groove from a reference position, (3) other structural vibrations, or (4) influence of an ID division.

Noise deriving from the offsets of the spindle motor and optical disk medium 213 of all the above adverse effects has a low frequency and large amplitude. Noises deriving from the error of the position of a track groove, the other structural vibrations, and the influence of an ID division have a high frequency and small amplitude. In the optical disk unit, dual servo control is employed in controlling two mechanisms of a coarse movement mechanism and fine movement mechanism simultaneously by assigning different control frequencies to the mechanisms according to the features of the mechanisms.

In the dual servo control, the lens actuator 204 is controlled by the feedback loop handling the tracking error signal, while the VCM 205 is controlled by a feedback loop handling the output of the lens position sensor 217. Alternatively, as shown in FIG. 22B, the speed of the VCM 205 (differential of the output of the position sensor) may be fed back for the purpose of damping.

Owing to the foregoing configuration, the carriage 202 tracks the movement of the lens 209. A large-amplitude component of an error signal indicating that an offset brings an intended track to outside the movable range of the lens actuator 204 can be transmitted to the VCM 205 in the form of the output of the lens position sensor 217. Thus, the combination of the lens actuator 204 and VCM 205 constitutes a dual servo control system.

FIGS. 23A to 23C show a tracking error signal (denoted by TES) generated during conventional seek, a driving speed of the VCM 205, and an output of a lens position sensor (lens position signal). Depending on the speed of the VCM 205, the carriage 202 tracks the movement of the lens 209. The lens 209 is locked in the center of the carriage 202 during seek.

In contrast, the optical disk unit of the fourth embodiment uses the lens actuator 62 described in conjunction with FIG. 20 but does not include a position sensor and lens position sensor. FIG. 22A shows the configuration of the lens actuator 62 shown in FIG. 20 in the form of a block diagram in the same manner as FIG. 22B showing the conventional lens actuator. Referring to FIG. 22A, there are shown an optical disk medium 1, a VCM 15, a base 20, a carriage 30, a lens actuator 62, an objective lens L, a photodetector 218, a filter 223, phase compensators 220, 224, and 226, a low-pass filter (LPF) 225, a spring 230, and switches SW1 and SW2.

Differences in the optical disk unit of the fourth embodiment from a conventional unit in terms of hardware are that the position sensor and lens position sensor are excluded and that the lens actuator 62 is supported on the carriage 30 by the spring 230. When the lens actuator 62 is supported on the carriage 30 by means of the spring 230, the following differences from the conventional unit arise:

(1) unwanted frictional forces do not arise because of the absence of bearings, and (2) the actuator 62 is provided with a restoration force (a force proportional to a shift) so that it will be restored to a balance position.

Since the lens actuator 62 is supported by the spring 230, a produced tracking error signal (TES) indicates a balance position at which the accelerating force of the lens actuator 62 and the spring force are balanced. In other words, the tracking error signal becomes a signal originally containing a component of a lens position sensor output due to the employment of the spring-supported actuator.

FIG. 23D shows a tracking error signal generated in the present invention when the lens alone is moved with the VCM fixed. FIG. 23E shows a lens signal produced by the lens actuator 62 having the aforesaid components. It is seen from the two signals that the envelope of the tracking error signal with a bias component thereof removed is used as the waveform of the lens signal. In the present invention, the tracking error signal is passed through the low-pass filter 225 among the components shown in FIG. 22A in order to remove high-frequency components. The phase compensator 226 then performs phase compensation. This results in a false lens signal shown in FIG. 23F. If the false lens signal is used with the noise thereof removed, although the lens position sensor is not included, the objective lens L can be locked by the lens actuator 62 during seek of the carriage 30.

What is claimed is:

1. An optical storage device for reproducing information from and/or recording information on an optical storage medium by irradiating a light beam generated by a stationary optical unit incorporated in a main body onto said optical storage medium via a carriage, which moves in a radial direction of said optical storage medium within said main body, in a state in which said optical storage medium loaded in said main body is rotated, comprising:

a cutoff frequency change means for temporarily setting the cutoff frequency of a filter means located on a path of a signal reproduced by way of said carriage to a normally-unused lower frequency immediately after said optical storage medium is loaded in said main body;

a sector spacing detection means for detecting a spacing of sectors of said optical storage medium using a signal sent from said filter means;

a position information memory means for storing positions in the radial direction of said optical storage medium, and frequencies and sector spacings associated with the positions; and a detection means for detecting the type of said optical storage medium and a position of a current reproduction track on the basis of a detected sector spacing and data stored in said position information memory means.

2. An optical storage device according to claim 1, wherein said track position detection means includes:

a reproduction frequency tentative setting means for inferring a position of a current track from data stored in said position information memory means according to a detected sector spacing, and for tentatively setting a reproduction frequency associated with the inferred track;

an ID recognition means for judging whether or not an ID recorded on said inferred track of said optical storage medium can be recognized at a tentatively set reproduction frequency;

a reproduction frequency fine adjustment means that, when an ID cannot be recognized, raises or lowers said reproduction frequency; and a track position finalizing means that when an ID can be recognized at a tentatively set reproduction frequency or a finely-adjusted reproduction frequency, finalizes a position of a current track in association with the reproduction frequency.

3. An optical storage device according to claim 2, further comprising a track position recognition execution means that when said track position detection means fails to recognize an ID by executing raising or lowering of a reproduction frequency a given number of times, judges that the type of said optical storage medium is different and executes track position detection associated with an optical storage medium of another type.

* * * * *